(12) United States Patent
Shimizu et al.

(10) Patent No.: US 12,472,134 B2
(45) Date of Patent: Nov. 18, 2025

(54) METHOD FOR MANUFACTURING 1,3-BUTYLENE GLYCOL, AND 1,3-BUTYLENE GLYCOL PRODUCT

(71) Applicant: DAICEL CORPORATION, Osaka (JP)

(72) Inventors: Masahiko Shimizu, Tokyo (JP); Ryuji Saitou, Tokyo (JP); Katsunori Makizawa, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 728 days.

(21) Appl. No.: 17/788,991

(22) PCT Filed: Dec. 23, 2020

(86) PCT No.: PCT/JP2020/048211
§ 371 (c)(1),
(2) Date: Jun. 24, 2022

(87) PCT Pub. No.: WO2021/132354
PCT Pub. Date: Jul. 1, 2021

(65) Prior Publication Data
US 2022/0354760 A1    Nov. 10, 2022

(30) Foreign Application Priority Data

Dec. 28, 2019 (JP) .................. 2019-239974
Dec. 28, 2019 (JP) .................. 2019-239975
(Continued)

(51) Int. Cl.
*A61K 8/34* (2006.01)
*A61Q 19/00* (2006.01)
(Continued)

(52) U.S. Cl.
CPC .............. *A61K 8/345* (2013.01); *A61Q 19/00* (2013.01); *A61Q 19/007* (2013.01);
(Continued)

(58) Field of Classification Search
CPC ....... C07C 29/80; C07C 29/141; C07C 29/60; C07C 31/207; A61Q 19/00; A61Q 19/007;
(Continued)

(56) References Cited

U.S. PATENT DOCUMENTS 5,345,004 A    9/1994  Nishiguchi
5,583,270 A    12/1996 Nishiguchi
(Continued)

FOREIGN PATENT DOCUMENTS

JP    63-156738 A    6/1988
JP    6-329664 A     11/1994
(Continued)

OTHER PUBLICATIONS

International Search Report for International Application No. PCT/JP2020/048211, dated Feb. 9, 2021, with English translation.
(Continued)

Primary Examiner — Jafar F Parsa
(74) Attorney, Agent, or Firm — Morgan, Lewis & Bockius LLP

(57) ABSTRACT

Provided is a method capable of manufacturing high-purity 1,3-butylene glycol having a high potassium permanganate test value, a very low content of low boiling point components, and a high initial boiling point with a high recovery rate.

The method for manufacturing 1,3-butylene is a method for obtaining purified 1,3-butylene glycol from a crude reaction liquid containing 1,3-butylene glycol. In a dehydration column used in a dehydration step, a liquid feed containing
(Continued)

1,3-butylene glycol and water with an acetaldehyde content of 1000 ppm or lower and a crotonaldehyde content of 400 ppm or lower is distilled under a condition of a reflux ratio of higher than 0.3, and a liquid concentrated with a low boiling point component containing water is distilled off from above a feed tray. In a product column used in a product distillation step, a 1,3-butylene glycol liquid feed with an acetaldehyde content of 500 ppm or lower and a crotonaldehyde content of 200 ppm or lower is distilled under a condition of a reflux ratio of higher than 0.1.

20 Claims, 3 Drawing Sheets

(30) Foreign Application Priority Data

| Dec. 28, 2019 | (JP) | 2019-239976 |
|---|---|---|
| Dec. 28, 2019 | (JP) | 2019-239977 |
| Dec. 28, 2019 | (JP) | 2019-239978 |
| Dec. 28, 2019 | (JP) | 2019-239979 |
| Jan. 20, 2020 | (JP) | 2020-006660 |
| Feb. 6, 2020 | (JP) | 2020-018910 |

(51) Int. Cl.
*B01D 3/42* (2006.01)
*C07C 29/141* (2006.01)
*C07C 29/60* (2006.01)
*C07C 29/80* (2006.01)
*C07C 29/84* (2006.01)
*C07C 31/20* (2006.01)

(52) U.S. Cl.
CPC .......... *B01D 3/4205* (2013.01); *C07C 29/141* (2013.01); *C07C 29/60* (2013.01); *C07C 29/80* (2013.01); *C07C 29/84* (2013.01); *C07C 31/207* (2013.01); *A61K 2800/10* (2013.01)

(58) Field of Classification Search
CPC ............ A61K 2800/10; A61K 2800/80; B01D 3/143; B01D 3/4216
See application file for complete search history.

(56) References Cited

U.S. PATENT DOCUMENTS

| 6,376,725 | B1 | 4/2002 | Tsuji et al. | |
|---|---|---|---|---|
| 6,900,360 | B2 | 5/2005 | Tsuji et al. | |
| 2003/0018224 | A1 | 1/2003 | Tsuji et al. | |
| 2004/0254407 | A1* | 12/2004 | Mizutani | C07C 29/80 |
| | | | | 568/852 |

FOREIGN PATENT DOCUMENTS

| JP | 2001-213825 A | 8/2001 |
|---|---|---|
| JP | 2001-213828 A | 8/2001 |
| JP | 2001-288131 A | 10/2001 |
| WO | WO 00/07969 A1 | 2/2000 |

OTHER PUBLICATIONS

Written Opinion of the International Search Authority for International Application No. PCT/JP2020/048211, dated Feb. 9, 2021, with English translation.
Partial Supplementary European Search Report for European Application No. 20905336.2, dated Feb. 27, 2024.
Boyd, "Modern Method of Controlling Rectification Column," Journal of the Society of Instrument and Control Engineers, vol. 3, No. 3, 1964, pp. 159-162, with an English translation,.
Japanese Office Action for Japanese Application No. 2021-567549; dated Oct. 29, 2024, with an English translation.

* cited by examiner

METHOD FOR MANUFACTURING 1,3-BUTYLENE GLYCOL, AND 1,3-BUTYLENE GLYCOL PRODUCT

TECHNICAL FIELD

The present disclosure relates to a method for manufacturing 1,3-butylene glycol, and a 1,3-butylene glycol product. The present patent application claims priority from the Japanese Patent Application No. 2019-239974, Japanese Patent Application No. 2019-239975, Japanese Patent Application No. 2019-239976, Japanese Patent Application No. 2019-239977, Japanese Patent Application No. 2019-239978 and Japanese Patent Application No. 2019-239979, all filed in Japan on Dec. 28, 2019, the Japanese Patent Application No. 2020-006660 filed in Japan on Jan. 20, 2020, and the Japanese Patent Application No. 2020-018910 filed in Japan on Feb. 6, 2020, the entire contents of which are incorporated herein by reference.

BACKGROUND ART 1,3-Butylene glycol is a colorless, transparent, and odorless liquid and has properties, such as low volatility, low toxicity, and high hygroscopicity, and has excellent chemical stability. 1,3-butylene glycol has a wide range of applications, including raw materials for various synthetic resins and surfactants, as well as materials for cosmetics, hygroscopic agents, high boiling point solvents, and antifreezes, etc. Particularly in recent years, 1,3-butylene glycol has been attracting attention for having excellent properties as a moisturizer, and demand is growing in the cosmetic industry.

A crude reaction liquid during manufacture of 1,3-butylene glycol contains a number of low boiling point impurities such as ethanol, butanol, acetaldehyde, crotonaldehyde, and esters. Among such impurities, acetaldehyde, crotonaldehyde, and the like cause high boiling point impurities to be produced when dimerized or polymerized. In addition, even in purification process of 1,3-butylene glycol, low boiling point impurities and high boiling point impurities are produced due to heat or the like. The few such impurities in 1,3-butylene glycol products, the more desirable. Patent Document 1 discloses a method of controlling an impurity derived from crotonaldehyde, which is a low boiling point impurity. Patent Document 2 discloses that a high-purity 1,3-butylene glycol product can be produced in good yield and economically advantageously when a crude reaction liquid for 1,3-butylene glycol synthesized by hydrogenation of acetaldols is made basic, alcohol is distilled off, and then distillation is performed.

Furthermore, Patent Document 2 discloses distilling off ethanol, isopropyl alcohol, and butanol, which are low boiling point impurities, by distillation.

CITATION LIST

Patent Document

Patent Document 1: JP 06-329664 A
Patent Document 2: JP 2001-213828 A

SUMMARY OF INVENTION

Technical Problem

However, with these known methods, low boiling point components and high boiling point components are not sufficiently removed from 1,3-butylene glycol. Cosmetics, which are an important application for 1,3-butylene glycol, typically contain water and require a long period of time from production until actual use by general consumers. In addition, from the viewpoint, such as storage stability of cosmetics, liquidity is strictly controlled.

When 1,3-butylene glycol containing low boiling point components and high boiling point components is used in cosmetics, an acid concentration increase can disrupt the liquidity balance of the cosmetics, and this can lead to a loss of the intended effect. In addition, the acid concentration increase of cosmetics can cause rough skin or the like of the users.

Further, during use and/or storage after use of a cosmetic, the cosmetic is exposed to air. In addition, in manufacturing cosmetics, the manufacturing work is usually performed in air atmosphere, and the product may be heated for the purposes of, for example, sterilization. When 1,3-butylene glycol containing low boiling point components and high boiling point components is used in cosmetics, coloration progresses in the presence of air or by influence of heating in some cases.

To solve such problems, removing by-products from crude 1,3-butylene glycol to obtain high-purity 1,3-butylene glycol has been required.

Meanwhile, one of quality standards for 1,3-butylene glycol includes initial boiling point. The higher the initial boiling point is, the better the quality. However, almost no technical studies for the purpose of improving the initial boiling point have been conducted so far. Also, a potassium permanganate test value (abbreviated as PMT) is one of the product standard for 1,3-butylene glycol. However, the potassium permanganate test value of the resulting 1,3-butylene glycol product obtained through known methods is not always fully satisfactory. Also, the substance that caused to reduce the potassium permanganate test value of 1,3-butylene glycol products has not been identified.

Thus, an object of the present disclosure is to provide a method capable of manufacturing high-purity 1,3-butylene glycol having a high potassium permanganate test value, a very low content of low boiling point components, and a high initial boiling point with a high recovery rate.

Another object of the present disclosure is to provide a high-purity 1,3-butylene glycol product having a high potassium permanganate test value, a very low content of low boiling point components and a high initial boiling point.

Still another object of the present disclosure is to provide a moisturizer and a cosmetic product that have excellent moisturizing performance and can maintain high quality for a long period of time.

Solution to Problem

As a result of diligent research to achieve the above-described purpose, the inventors of the present disclosure have found that, by specifying a content of acetaldehyde and crotonaldehyde in a liquid feed into a dehydration column and controlling a reflux ratio in the dehydration column, specifying a content of acetaldehyde and crotonaldehyde in a 1,3-butylene glycol liquid feed into a product column and controlling a reflux ratio in the product column, and preferably, also by recycling a product column distillate to a step prior to the product distillation step, it is possible to efficiently remove low boiling components mixed in the liquid feed into the product column and to maintain and improve a recovery rate of 1,3-butylene glycol with an initial boiling point of 1,3-butylene glycol and a potassium permanganate test value being maintained within standard values. The present disclosure has been completed by conducting further studies based on these findings.

Specifically, the present disclosure provides a method for manufacturing 1,3-butylene glycol, which is a method for obtaining purified 1,3-butylene glycol from a crude reaction liquid containing 1,3-butylene glycol, the method including: a dehydration step of removing water by distillation; a high boiling substance removal step of removing a high boiling point component by distillation; and a product distillation step of obtaining purified 1,3-butylene glycol, wherein in the dehydration step, a dehydration column is used in which a liquid feed containing 1,3-butylene glycol and water with an acetaldehyde content of 1000 ppm or lower and a crotonaldehyde content of 400 ppm or lower is distilled under a condition of a reflux ratio of higher than 0.3, and a liquid concentrated with a low boiling point component containing water is distilled off from above a feed plate, and in the product distillation step, a product column is used in which a 1,3-butylene glycol liquid feed with an acetaldehyde content of 500 ppm or lower and a crotonaldehyde content of 200 ppm or lower is distilled under a condition of a reflux ratio of higher than 0.1, a liquid concentrated with a low boiling point component is distilled off from above a feed plate, and 1,3-butylene glycol is extracted from below the feed plate.

The crude reaction liquid containing 1,3-butylene glycol may be a crude reaction liquid obtained by hydrogen reduction of an acetaldol.

The manufacturing method may further include an alkaline treatment step of treating a process stream containing 1,3-butylene glycol with a base.

Furthermore, the manufacturing method may further include a desalting step of removing a salt in a process stream containing 1,3-butylene glycol.

Furthermore, the manufacturing method may further include a dealcoholization step of removing a low boiling substance containing alcohols in a process stream containing 1,3-butylene glycol.

The content of acetaldehyde in the liquid feed into the dehydration column may be 155 ppm or lower, and the content of crotonaldehyde in the liquid feed may be 117 ppm or lower.

A content of water in the liquid feed into the dehydration column may be 90 wt. % or lower.

The dehydration column has the number of theoretical plates of, for example, from 1 to 100.

A concentration of 1,3-butylene glycol in the liquid feed into the product column may be 90 GC area % or higher, and a content of water in the liquid feed may be 3 wt. % or lower.

A content of the low boiling point component other than water in the liquid feed into the product column may be 1.8 GC area % or lower.

The content of acetaldehyde in the liquid feed into the product column may be 205 ppm or lower, and the content of crotonaldehyde in the liquid feed may be 110 ppm or lower.

A distillation rate in the product column may be less than 30 wt. %.

The number of theoretical plates of the product columns is, for example, from 1 to 100 plates At least a portion of a distillate from the product column may be recycled to a step prior to the product distillation step, namely the dehydration step, a dealcoholization step, a low boiling substance removal step, or another step prior to these steps.

The crude reaction liquid containing 1,3-butylene glycol may be a crude reaction liquid obtained by hydrogen reduction of acetaldols, and at least a portion of the distillate from the product column may be recycled to the hydrogen reduction of acetaldols or a step upstream of the hydrogen reduction.

An amount of the distillate from the product column being recycled to the step prior to the product distillation step may be lower than 30 wt. % with respect to a charged amount into the product column within a range not higher than a distilled amount in the product column.

The present disclosure also provides a 1,3-butylene glycol product having an initial boiling point of higher than 203° C. and a potassium permanganate test value of 30 minutes or longer.

The 1,3-butylene glycol product may have, according to a gas chromatographic analysis performed under conditions set forth below, an area ratio of a 1,3-butylene glycol peak of higher than 98.7%, a total area ratio of peaks having shorter retention times than the 1,3-butylene glycol peak of lower than 0.3%, and a water content of lower than 0.4 wt. %, and have, according to GC-MS analysis performed under conditions set forth below, an acetaldehyde content of lower than 2 ppm and a crotonaldehyde content of lower than 1.2 ppm, in which the conditions for the gas chromatographic analysis are as follows:

Analytical Column: a column with dimethylpolysiloxane as a stationary phase, having a length of 30 m, an inner diameter of 0.25 mm, and a film thickness of 1.0 μm Heating Conditions: heating from 80° C. to 120° C. at 5° C./min, then heating again to 160° C. at 2° C./min and maintaining for 2 minutes, and further heating to 230° C. at 10° C./min and maintaining at 230° C. for 18 minutes Sample Introduction Temperature: 250° C.

Carrier Gas: helium

Column Gas Flow Rate: 1 mL/min

Detector and Detection Temperature: a flame ionization detector (FID), 280° C.

Conditions for GC-MS analysis

Analytical Column: HP-1MS [18] 30 m-0.25 mm i.d.-1.0 μm

Oven Temperature: 80° C. (0 min)-5° C./min-120° C. (0 min)-2° C./min-160° C. (2 min)-10° C./min-230° C. (18 min)

Carrier Gas: He 0.61 mL/min, const. flow (line speed: 29 cm/sec)

Split: 20:1

Inj: 250° C.

AUX: 280° C.

Injection Volume: 1 μL (ALS)

Ion Source Temperature: EI 230° C., CI 250° C.

Q Pole temperature: 150° C.

Sample: subjected to analysis as it was

The present disclosure further relates to a moisturizer containing the 1,3-butylene glycol product.

Furthermore, the present disclosure further provides a cosmetic product containing the moisturizer.

In the present disclosure, "1,3-butylene glycol product" means a composition in which 1,3-butylene glycol occupies a majority of the components (e.g., a 1,3-butylene glycol content is 95 wt. % or higher, preferably 98 wt. % or higher).

Advantageous Effects of Invention

According to the manufacturing method of the present disclosure, it is possible to industrially efficiently manufacture high-purity 1,3-butylene glycol having a high potassium permanganate test value, a very low content of low boiling point components, and a high initial boiling point.

Further, the 1,3-butylene glycol product of the present disclosure has a high potassium permanganate test value, a very low content of low boiling point components, a high initial boiling point, and high purity. Therefore, it is suitably used as a moisturizer, and in an application as a raw material for cosmetics.

Further, the moisturizer and cosmetic product of the present disclosure are excellent in moisturizing performance and have an extremely low content of reducing materials and low boiling point components, and thus can maintain high quality for a long period of time.

DESCRIPTION OF EMBODIMENTS

Method for Manufacturing 1,3-Butylene Glycol

Figure 1:
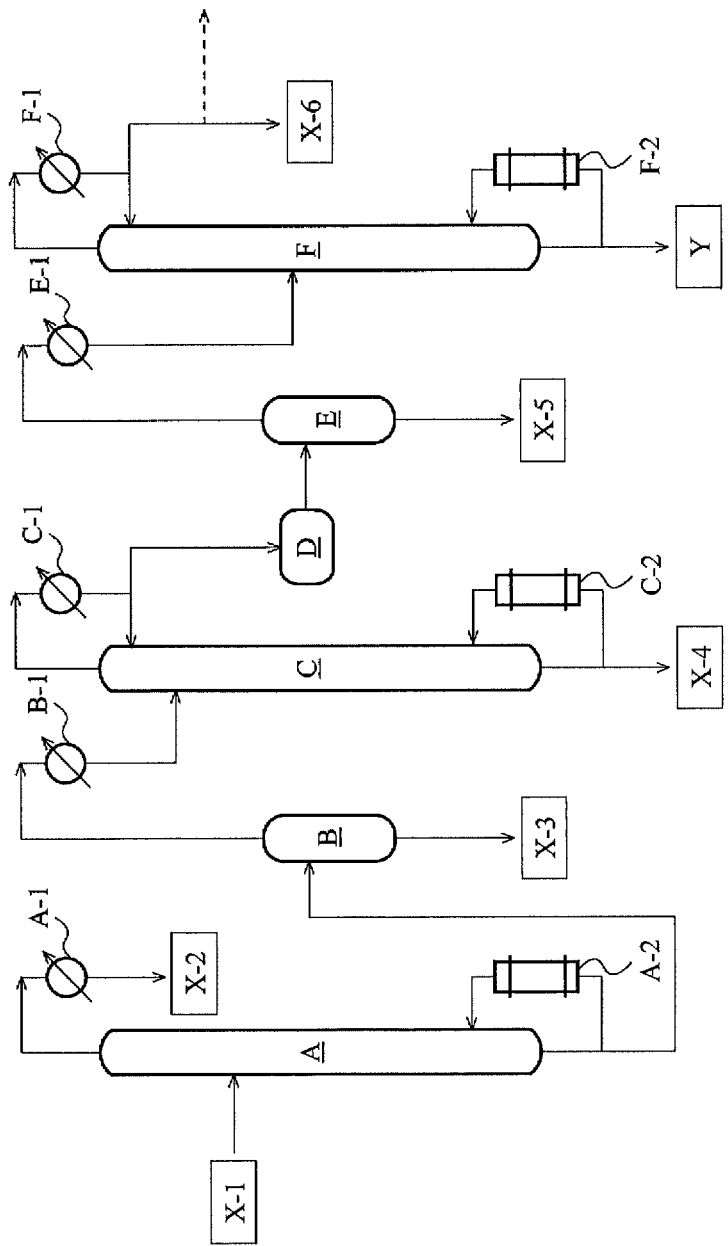
FIG. 1 is a flowchart of a manufacturing method (purification method) for a 1,3-butylene glycol product of the present disclosure.

The manufacturing method of the present disclosure is a method for manufacturing 1,3-butylene glycol, in which purified 1,3-butylene glycol is obtained from a crude reaction liquid containing 1,3-butylene glycol (1,3 BG) (hereinafter sometimes referred to as "crude 1,3-butylene glycol"), the method including: a dehydration step of removing water by distillation; a high boiling substance removal step of removing a high boiling point component by distillation; and a product distillation step of obtaining purified 1,3-butylene glycol. In a dehydration column for use in the dehydration step, a liquid feed containing 1,3-butylene glycol and water with an acetaldehyde content of 1000 ppm or lower and a crotonaldehyde content of 400 ppm or lower is distilled under a condition of a reflux ratio of higher than 0.3, and a liquid concentrated with a low boiling point component containing water is distilled off from above a feed plate. In a product column for use in the product distillation step, a 1,3-butylene glycol liquid feed with an acetaldehyde content of 500 ppm or lower and a crotonaldehyde content of 200 ppm or lower is distilled under a condition of a reflux ratio of higher than 0.1, a liquid concentrated with a low boiling point component is distilled off from above a feed plate, and 1,3-butylene glycol is extracted from below the feed plate. The thus obtained 1,3-butylene glycol can be made into a 1,3-butylene glycol product since it has a high potassium permanganate test value, a very low content of low boiling point components, and a high initial boiling point.

The "GC area %" refers to a ratio of a peak area of a subject component relative to a total peak area in gas chromatographic analysis which will be described below.

Crude 1,3-Butylene Glycol

Examples of the crude 1,3-butylene glycol include: (1) a crude reaction liquid obtained by reduction (hydrogenation) of acetaldols; (2) a crude reaction liquid obtained by hydrolyzation of 1,3-butylene oxide; (3) a crude reaction liquid obtained by selective hydrocracking of erythritol; (4) a crude reaction liquid obtained by selective water addition to butadiene; (5) a crude reaction liquid obtained by hydrogen addition to n-butanal-3-one; (6) a crude reaction liquid obtained by hydrogen addition to 1-butanol-3-one; (7) a crude reaction liquid obtained by hydrogen addition to 3-hydroxy-1-butanoic acid; (8) a crude reaction liquid obtained by hydrogen addition to β-butyrolactone; and (9) a crude reaction liquid obtained by hydrogen addition to diketene. In the present disclosure, the crude 1,3-butylene glycol may be one, or a mixture of two or more, of the above (1) to (9). The crude 1,3-butylene glycol is preferably (1) the crude reaction liquid obtained by reduction (in particular, liquid phase reduction) of acetaldols.

Hereinafter, a case where the crude reaction liquid obtained by reduction (hydrogenation) of acetaldols is used as the crude 1,3-butylene glycol will be mainly described. Note that the reduction (hydrogenation) of acetaldols is sometimes referred to as "hydrogenation step".

The acetaldols used as a raw material in the hydrogenation step are not particularly limited, as long as they are a compound that yields 1,3-butylene glycol by hydrogen reduction. Examples of the raw material acetaldols include acetaldol; its cyclic dimer paraldol; aldoxane as a cyclic trimer of acetaldehyde; and mixtures of these.

The method of manufacturing the acetaldols (e.g., acetaldol or paraldol) is not particularly limited, but the acetaldol may be, for example, those obtained by an aldol condensation reaction of acetaldehyde in the presence of a basic catalyst or those obtained by pyrolysis or the like of aldoxane. Note that the manufacture of the acetaldols is sometimes referred to as "acetaldol manufacture" or "acetaldehyde polymerization".

A crude reaction liquid obtained by the reaction described above and containing acetaldols may be neutralized with an acid and used in the manufacturing of 1,3-butylene glycol. Such a crude reaction liquid may contain, in addition to acetaldols, acetaldehyde, crotonaldehyde, another aldehyde component; a low boiling point substance; a high boiling point substance, such as an aldehyde dimer or trimer; water; a salt; and the like. In the present specification, a compound having a lower boiling point than 1,3-butylene glycol may be referred to as a "low boiling point substance" or "low boiling substance", and a compound having a higher boiling point than 1,3-butylene glycol may be referred to as a "high boiling point substance" or "high boiling substance".

The crude reaction liquid containing acetaldols may be subjected to a pretreatment, such as dealcoholization distillation, dehydration distillation, desalting, alkaline treatment and dealkalization treatment, or impurity removal, as necessary, and a product obtained by removing by-products, such as unreacted acetaldehyde and crotonaldehyde, may be used. Examples of the pretreatment method include distillation, adsorption, ion exchange, conversion to a high boiling point substance by heating, and decomposition. For the distillation, a distillation method of various types, such as reduced pressure, normal pressure, increased pressure, azeotropic, extraction, or reaction, can be used. In particular, it is preferred that the crude reaction liquid containing acetaldols is subjected to simple evaporation, distillation, or hydrogen addition to remove aldehydes such as acetaldehyde and crotonaldehyde, followed by the hydrogenation step.

The content of the acetaldols in the raw material for hydrogenation is not particularly limited but is, for example, preferably 30 wt. % or higher (e.g., from 30 to 99 wt. %), more preferably 40 wt. % or higher (for example, from 40 to 98 wt. %), 50 wt. % or higher (for example, from 50 to 97 wt. %) or 60 wt. % or higher (for example, from 60 to 95 wt. %), and even more preferably from 65 to 90 wt. %, particularly preferably from 70 to 90 wt. %, and most preferably from 75 to 90 wt. %. With the content of the acetaldol within the above ranges, impurities contained in the crude reaction liquid containing 1,3-butylene glycol (crude 1,3-butylene glycol) tend to be reduced.

The raw material for hydrogenation may or may not contain water but preferably contains water from the viewpoint of the purity of 1,3-butylene glycol product. The water content in the raw material for hydrogenation is not particularly limited but is, for example, preferably 2 wt. % or higher, more preferably 5 wt. % or higher, even more preferably 10 wt. % or higher, and particularly preferably 15 wt. % or higher. The upper limit may be, for example, 90 wt. %, 80 wt. %, 70 wt. %, 60 wt. %, 50 wt. %, 40 wt. %, 30 wt. % or 20 wt. %. With the water content within the above ranges, the acetal of 1,3-butylene glycol and acetaldol contained in the resulting crude 1,3-butylene glycol is decreased, and thus this tends to increase the purity of the 1,3-butylene glycol product finally obtained. This is because the raw material for hydrogenation contains water to a certain extent, and the acetal is hydrolyzed into 1,3-butylene glycol accordingly as well as coexisting acetaldol is reduced into 1,3-butylene glycol.

Examples of the hydrogenation catalyst include Raney nickel. The hydrogenation catalyst can be used in a suspended state, or can also be added into a reaction vessel and used. The amount of the hydrogenation catalyst to be used is not particularly limited but is, for example, preferably from 1 to 30 parts by weight, more preferably from 4 to 25 parts by weight, even more preferably from 8 to 20 parts by weight, and particularly preferably from 12 to 18 parts by weight relative to 100 parts by weight of the raw material for hydrogenation. The amount of hydrogen to be used in the reduction reaction is not particularly limited but is, for example, preferably from 0.5 to 40 parts by weight, more preferably from 1 to 30 parts by weight, even more preferably from 4 to 20 parts by weight, and particularly preferably from 8 to 12 parts by weight relative to 100 parts by weight of the raw material for hydrogenation. A pressure (total pressure; gauge pressure) in a reaction system in the reduction reaction is not particularly limited, but is, for example, preferably from 9 to 70 MPa and more preferably from 10 to 40 MPa. A hydrogen pressure (partial pressure of hydrogen) in the reaction system is not particularly limited, but is, for example, from 7 to 60 MPa, and preferably from 10 to 30 MPa. Note that, from the perspective of reducing the reducing materials such as acetaldehyde and crotonaldehyde, it is better to increase the hydrogen pressure in the reaction system, and the hydrogen pressure is preferably 10 MPa or higher, and may be 100 MPa. The reaction temperature in the reduction reaction is not particularly limited but is, for example, preferably from 40 to 150° C., preferably from 50 to 140° C., and more preferably from 60 to 130° C. The reaction time (residence time) in the reduction reaction is not particularly limited but is, for example, from 10 to 500 minutes, preferably from 20 to 400 minutes, more preferably from 30 to 300 minutes, even more preferably from 50 to 280 minutes, and particularly preferably from 80 to 250 minutes. The present reaction can be carried out in any of a batch, semi-batch, or continuous manner.

For example, the thus-obtained crude 1,3-butylene glycol contains acetaldehyde (AD); butylaldehyde; crotonaldehyde (CR); acetone; a low boiling point substance (low boiling point compound) having an unsaturated bond, such as methyl vinyl ketone; a condensate of these; a condensate of 1,3-butylene glycol and the above low boiling point substance (e.g., an acetal of 1,3-butylene glycol and acetaldol); an alcohol such as ethanol, isopropyl alcohol, or butanol; water (for example, solvent), a salt produced by neutralization or the like, a catalyst (when used in suspension) or the like. By removing these impurities in the purification step, a 1,3-butylene glycol product (purified 1,3-butylene glycol) can be obtained.

Purification of Crude 1,3-Butylene Glycol

The manufacturing method according to the present disclosure includes, at least, a dehydration step of removing water by distillation, a high boiling substance removal step of removing a high boiling point component by distillation (high boiling point substance removal distillation), and a product distillation step of obtaining purified 1,3-butylene glycol. The dehydration step and the high boiling substance removal step are both provided before the product distillation step, but the order of the dehydration step and the high boiling substance removal step does not matter. The manufacturing method according to the present disclosure may include, in addition to these steps, a desalting step, an alkaline reaction step (an alkaline treatment step), and a dealkalization step. Additionally, prior to the dehydration step, catalyst separation step, neutralization step by alkali, dealcoholization step (low boiling substance removal step), and the like can be provided. These steps may be performed in the order described above, but the order of these steps may be changed as appropriate except that the dealkalization step is provided after the alkaline reaction step. For example, the dealcoholization step (low boiling substance removal step), the desalting step, the alkaline reaction step, and the dealkalization step can be performed in an appropriate order, but are usually performed after the hydrogenation step. Note that, among the above-described steps, the catalyst separation step, the neutralization step by alkali, the dealcoholization step (low boiling substance removal), the desalting step, the alkaline reaction step, and the dealkalization step may be performed as necessary, and do not necessarily have to be performed.

FIG. 1 is a flow sheet of an apparatus illustrating an example of an embodiment for manufacturing 1,3-butylene glycol of the present disclosure. A is a dehydration column and is related to the dehydration step. B is a desalting column and is related to the desalting step. C is a distillation column for removing a high boiling substance (high boiling substance removal column) and is related to the high boiling substance removal distillation step (high boiling substance removal). D is an alkaline reactor and is related to the alkaline reaction step. E is a dealkalization column and is related to the dealkalization step. F is a product distillation column (product column) and is related to the product distillation step. A-1, B-1, C-1, E-1, and F-1 are condensers. A-2, C-2, and F-2 are reboilers. Hereinafter, an example of an embodiment of the method for manufacturing 1,3-butylene glycol of the present disclosure will be described using the present flow sheet.

Crude 1,3-butylene glycol (corresponding to "X-1") obtained by hydrogen reduction of a raw material for hydrogenation is fed to the dehydration column A. Note that the crude 1,3-butylene glycol (corresponding to "X-1") may be fed to the dehydration column A after undergoing the dealcoholization (distillation by a dealcoholization column) for removing an alcohol such as ethanol and a low boiling point substance.

In the manufacturing method of the present disclosure, in the dehydration column A for use in the dehydration step, a liquid feed containing 1,3-butylene glycol and water with an acetaldehyde content of 1000 ppm or lower and a crotonaldehyde content of 400 ppm or lower is distilled under a condition of a reflux ratio of higher than 0.3, and a liquid concentrated with a low boiling point component containing water is distilled off from above a feed plate (preferably, top of the column) (corresponding to "X-2" in FIG. 1). Further, a crude 1,3-butylene glycol stream containing 1,3-butylene glycol can be obtained from below the feed plate (preferably, the bottom of the column).

The dehydration column A and any other distillation column for separating 1,3-butylene glycol can be, for example, perforated-plate columns, bubble columns, and the like, but are more preferably packed columns with a low pressure loss, filled with Sulzer Packing, Melapack (trade names owned by Sumitomo Heavy Industries, Ltd.). This is because 1,3-butylene glycol and trace impurities would be thermally decomposed at a high temperature (e.g., 150° C. or higher) and produce a low boiling point substance, which is a coloring component, and thus the distillation temperature is to be lowered. In addition, this is also because a long thermal history (residence time) for 1,3-butylene glycol would also have a similar effect. Thus, the reboiler employed is preferably one with a short residence time of the process side fluid, for example, a thin-film evaporator, such as a natural downward flow thin-film evaporator or a forced-stirring thin-film evaporator.

The number of theoretical plates of the dehydration column A is, for example, from 1 to 100 plates, preferably from 2 to 80 plates, from 3 to 80 plates, from 4 to 60 plates, from 5 to 40 plates, from 6 to 30 plates or from 7 to 20 plates, and more preferably from 8 to 15 plates. A feed position for the liquid feed is, for example, from 10 to 90%, preferably from 20 to 80%, and more preferably from 30 to 70%, and even more preferably from 40 to 60% of a height of the column facing downward from the top of the column. During the distillation in the dehydration column A, the pressure (absolute pressure) of the top of the column is, for example, 101 kPa or lower, preferably from 0.1 to 90 kPa, more preferably from 0.5 to 70 kPa, and even more preferably from 1 to 50 kPa, from 2 to 30 kPa or from 3 to 20 kPa, and particularly preferably from 4 to 10 kPa. Note that the distillation in the dehydration column A may be performed under pressure, in which case the pressure (gauge pressure) at the top of the column may be, for example, 0.2 MPaG or lower, or 0.1 MPaG or lower.

A concentration of 1,3-butylene glycol in the liquid feed into the dehydration column A is, for example, 9 wt. % or higher, preferably 10 wt. % or higher, more preferably 15 wt. % or higher, even more preferably 20 wt. % or higher, 25 wt. % or higher, 30 wt. % or higher, 35 wt. % or higher, 40 wt. % or higher, 45 wt. % or higher, 50 wt. % or higher, 55 wt. % or higher, or 60 wt. % or higher, and particularly preferably 70% or higher. An upper limit of the concentration of 1,3-butylene glycol in the liquid feed into the dehydration column A is, for example, 90 wt. %, 85 wt. %, or 80 wt. %. However, in consideration of the hydrogen addition reaction and the like in the step prior to the dehydration step, the concentration of water in the liquid feed into the dehydration column A is preferably higher in some cases. With these things taken into consideration, the concentration of 1,3-butylene glycol in the liquid feed into the dehydration column A may be, for example, 1 wt. % or higher, 5 wt. % or higher, 10 wt. % or higher, 15 wt. % or higher, 20 wt. % or higher, 25 wt. % or higher, 30 wt. % or higher, 35 wt. % or higher, 40 wt. % or higher, 50 wt. % or higher, 60 wt. % or higher, 70 wt. % or higher, 80 wt. % or higher, or 90 wt. % or higher. Furthermore, the concentration of 1,3-butylene glycol in liquid feed into the dehydration column A may be, for example, 99 wt. % or lower, 95 wt. % or higher, 90 wt. % or lower, 85 wt. % or lower, 80 wt. % or lower, 75 wt. % or lower, 70 wt. % or lower, 65 wt. % or lower, 60 wt. % or lower, 55 wt. % or lower, 50 wt. % or lower, or 45 wt. % or lower. The concentration of 1,3-butylene glycol in the liquid feed into the dehydration column A can be, for example, in the range described above by adjusting the reaction conditions in the hydrogenation (for example, the concentration of acetaldols used as a raw material) and the distillation conditions of the dealcoholization column (low boiling substance removal column) provided before the dehydration column as needed.

The concentration (wt. %) of 1,3-butylene glycol is a value determined according to the following formula by determining an area proportion (GC area %) of the peak of 1,3-butylene glycol relative to a total peak area in the gas chromatographic analysis under the following conditions. Note that the concentration (wt. %) of water in the liquid feed into the dehydration column A is a value measured by the method which will be described below (Karl Fischer method).

Concentration (wt. %) of 1,3-butylene glycol in liquid feed into dehydration column $A=(1-\text{concentration (wt. %) of water in liquid feed into dehydration column } A/100)\times GC$ area % of 1,3-butylene glycol described above, Conditions for the gas chromatographic analysis are as follows:
Analytical Column: a column with dimethylpolysiloxane as a stationary phase, having a length of 30 m, an inner diameter of 0.25 mm, and a film thickness of 1.0 μm
Heating Conditions: heating from 80° C. to 120° C. at 5° C./min, then heating again to 160° C. at 2° C./min and maintaining for 2 minutes, and further heating to 230° C. at 10° C./min and maintaining at 230° C. for 18 minutes
Sample Introduction Temperature: 250° C.
Carrier Gas: helium
Column Gas Flow Rate: 1 mL/min
Detector and Detection Temperature: a flame ionization detector (FID), 280° C.

In the manufacturing method of the present disclosure, the content of acetaldehyde in the liquid feed into the dehydration column A is 1000 ppm or lower, and the content of crotonaldehyde therein is 400 ppm or lower. The content of acetaldehyde in the liquid feed into the dehydration column A is preferably 900 ppm or lower, more preferably 800 ppm or lower, 700 ppm or lower, 600 ppm or lower, or 500 ppm or lower, and even more preferably 400 ppm or lower, 300 ppm or lower, 200 ppm or lower, 155 ppm or lower, or 140 ppm or lower, and may be 100 ppm or lower, 90 ppm or lower, 80 ppm or lower, 70 ppm or lower, 60 ppm or lower, 50 ppm or lower, 40 ppm or lower, or 30 ppm or lower, 20 ppm or lower, 10 ppm or lower, 5 ppm or lower, 3 ppm or lower, 2 ppm or lower, or 1 ppm or lower.

The content of crotonaldehyde in the liquid feed into the dehydration column A is preferably 300 ppm or lower, more preferably 200 ppm or lower, and even more preferably 150 ppm or lower, 130 ppm or lower, 117 ppm or lower, or 100 ppm or lower, and may be 90 ppm or lower, 80 ppm or lower, 70 ppm or lower, 60 ppm or lower, 50 ppm or lower, 40 ppm or lower, 30 ppm or lower, 20 ppm or lower, 10 ppm or lower, 5 ppm or lower, 3 ppm or lower, 2 ppm or lower, or 1 ppm or lower.

The acetaldehyde content and the crotonaldehyde content in the liquid feed into the dehydration column A can be reduced, for example, by providing a dealcoholization column (low boiling substance removal column) upstream of the dehydration column A, and adjusting the distillation conditions of the dealcoholization column (low boiling substance removal column). For example, increasing the reflux ratio and the number of plates, and the distillation rate in the dealcoholization column (low boiling substance removal column) can reduce the acetaldehyde content and the crotonaldehyde content of the liquid feed into the dehydration column A. Furthermore, the content can be adjusted according to the conditions for the hydrogen addition reaction in the hydrogenation step, and when hydrogen addition is fully performed, the concentrations of acetaldehyde and crotonaldehyde can be lowered to below the detection limit, but there are disadvantages such as a high reaction pressure, an increase in size of the reaction tank and the like.

Note that the acetaldehyde content and the crotonaldehyde content of the liquid feed into the dehydration column A can be quantified by GC-MS analysis (gas mass spectrometry).

In the manufacturing method of the present disclosure, the content of water in the liquid feed into the dehydration column A is, for example, 90 wt. % or lower, 85 wt. % or lower, 80 wt. % or lower, 70 wt. % or lower, 60 wt. % or lower, 50 wt. % or lower, or 40 wt. % or lower, and preferably 35 wt. % or lower, more preferably 30 wt. % or lower, and even more preferably 25 wt. % or lower. A lower limit of the water content in the liquid feed into the dehydration column A is, for example, 1 wt. %, 5 wt. %, 10 wt. % or 15 wt. %. Note that, when the hydrogen addition reaction in the hydrogenation step is taken into consideration, higher water concentration and lower the viscosity are advantageous for the hydrogen addition reaction because they increase the solubility and degree of dispersion of hydrogen in the liquid. The water content of the liquid feed into the dehydration column A can be reduced, for example, by providing a dealcoholization column (low boiling substance removal column) upstream of the dehydration column A, and adjusting the distillation conditions of the dealcoholization column (low boiling substance removal column). For example, increasing the reflux ratio and the number of plates, and the distillation rate in the dealcoholization column (low boiling substance removal column) can reduce the water content of the liquid feed into the dehydration column A. Note that the water content of the liquid feed into the dehydration column A can be quantified by the Karl Fischer moisture measurement instrument.

The content of the components other than 1,3-butylene glycol, acetaldehyde, crotonaldehyde and water in the liquid feed into the dehydration column A is, for example, 10 wt. % or lower, preferably 8 wt. % or lower, and more preferably 6 wt. % or lower.

In the manufacturing method of the present disclosure, the reflux ratio in the dehydration column A [dehydration column reflux amount/dehydration column distilled amount (discharge amount to outside of distillation column) is a value higher than 0.3. The reflux ratio is preferably 0.4 or higher, 0.5 or higher, 0.6 or higher, or 0.7 or higher, 0.8 or higher, 0.9 or higher, 1 or higher, 1.1 or higher, 1.2 or higher, 1.3 or higher, 1.4 or higher, 1.5 or higher, 1.6 or higher, 1.7 or higher, 1.8 or higher, 1.9 or higher, 2 or higher, 3 or higher, 4 or higher, 5 or higher, 6 or higher, 7 or higher, 8 or higher, 9 or higher, 10 or higher, 15 or higher, 20 or higher, or 25 or higher, and more preferably 30 or higher (for example, 40 or higher), from the perspective of reducing the content of the low boiling point substance (containing water) in the crude 1,3-butylene glycol stream containing 1,3-butylene glycol taken out from below the feed plate of the dehydration column A (preferably, the bottom of the column). An upper limit of the reflux ratio is, for example, 100, preferably 50 from the point of energy cost. In a case where the number of theoretical plates of the dehydration column A is large, sufficient separation can be performed, if the reflux ratio is 10 or 20, or lower.

In the manufacturing method of the present disclosure, the distillation rate in the dehydration column A can be appropriately set in accordance with the concentration of water in the liquid feed into the dehydration column A. Desirably, the distillation rate is a sufficient distillation rate for the total amount of water in the liquid feed to be distilled. For example, in a case where the concentration of water in the liquid feed into the dehydration column A is X wt. %, the distillation rate in the dehydration column A is preferably X wt. % or higher. Therefore, the distillation rate in the dehydration column A is, for example, 95 wt. % or lower, 90 wt. % or lower, 85 wt. % or lower, 80 wt. % or lower, 75 wt. % or lower, 70 wt. % or lower, 65 wt. % or lower, 60 wt. % or lower, 55 wt. % or lower, 50 wt. % or lower, 45 wt. % or lower, 40 wt. % or lower, 35 wt. % or lower, 30 wt. % or lower, 25 wt. % or lower, 20 wt. % or lower, 15 wt. % or lower, 10 wt. % or lower, or 5 wt. % or lower. The distillation rate refers to a proportion (wt. %) of an amount of liquid extracted from above the feed plate of the dehydration column A (e.g., the top of the column) to the outside of the distillation column with respect to a charged amount into the dehydration column A.

In the manufacturing method of the present disclosure, the 1,3 BG recovery rate in the dehydration column A is, for example, 99.3% or higher. Note that, in the present specification, the 1,3 BG recovery rate in the dehydration column A is a value (%) determined by the following formula.

$$\{1-[\text{concentration (wt. \%) of 1,3 BG in distillate} \times (\text{distilled amount (part)} - \text{recycled amount (part)})] / (\text{concentration (wt. \%) of 1,3 BG in liquid feed} \times \text{charged amount (part)})\} \times 100$$

Note that the low boiling point substance and the high boiling point substance may be hydrolyzed by water to produce 1,3 BG, while the high boiling point substance may be produced by polymerization of 1,3 BG. Further, trace impurities may be produced or disappear. Thus, the mass balance in the dehydration column may not always be made. This applies to the dealcoholization column (low boiling substance removal column), the high boiling substance removal column, the product column, and other distillation columns.

Next, the crude 1,3-butylene glycol stream containing 1,3-butylene glycol taken out from below the feed plate of the dehydration column A (preferably, the bottom of the column) is fed to the desalting column B. In the desalting column B, the crude 1,3-butylene glycol stream after the desalting is obtained from the top of the column, and a salt, a high boiling point substance, or the like is discharged from the bottom of the column. The bottom rate (%) of the desalting column B [(desalting column bottom amount (part)/desalting column charged amount (part)×100] is, for example, from 0.1 to 40 wt. %, preferably from 1 to 35 wt. %, more preferably from 2 to 30 wt. %, even more preferably from 3 to 25 wt. %, and particularly preferably from 5 to 20 wt. %, and may be from 7 to 15 wt. %. At least a portion of the bottom in the desalting column may be recycled to the step prior to the desalting.

The crude 1,3-butylene glycol stream after the desalting described above is fed to the high boiling substance removal column C. In the high boiling substance removal column C, the high boiling point component (preferably, high boiling point substance) is discharged from below the feed plate (preferably, from the bottom of the column). Meanwhile, the crude 1,3-butylene glycol stream after high boiling point substance removal (higher-purity 1,3-butylene glycol) is obtained from above the feed plate.

The high boiling substance removal column C can be, for example, a perforated-plate column, a bubble column, or the like, but is more preferably a packed column with a low pressure loss, filled with Sulzer Packing, Melapack (trade names of Sumitomo Heavy Industries, Ltd.). This is because 1,3-butylene glycol and trace impurities would be thermally decomposed at a high temperature (e.g., 150° C. or higher) and produce a low boiling point substance, which is a coloring component, and thus the distillation temperature is to be lowered. In addition, this is also because a long thermal history (residence time) for 1,3-butylene glycol would also have a similar effect. Thus, the reboiler employed is preferably one with a short residence time of the process side fluid, for example, a thin-film evaporator, such as a natural downward flow thin-film evaporator or a forced-stirring thin-film evaporator.

The number of theoretical plates of the high boiling substance removal column C is, for example, from 1 to 100 plates, preferably from 2 to 90 plates, more preferably from 3 to 80 plates, more preferably from 4 to 70 plates, from 5 to 60 plates, from 8 to 50 plates, or from 10 to 40 plates, and particularly preferably from 15 to 30 plates. A feed position for the liquid feed is, for example, from 10 to 90%, preferably from 20 to 80%, more preferably from 30 to 70%, and even more preferably from 40 to 60% of a height of the column facing downward from the top of the high boiling substance removal column. In the distillation in the high boiling substance removal column C, a pressure (absolute pressure) at the top of the column is, for example, from 0.01 to 50 kPa, preferably from 0.1 to 30 kPa, more preferably from 0.3 to 20 kPa, and even more preferably from 0.5 to 10 kPa.

The reflux ratio in the high boiling substance removal column C [high boiling substance removal column reflux amount/high boiling substance removal column distilled amount (discharge amount to outside of distillation column)] is, for example, 0.015 or higher, preferably 0.02 or higher, 0.03 or higher, 0.05 or higher, 0.07 or higher, 0.1 or higher, 0.2 or higher, 0.3 or higher, 0.4 or higher, 0.5 or higher, 0.6 or higher, 0.7 or higher, 0.8 or higher, 0.9 or higher, 1 or higher, 2 or higher, 3 or higher, 4 or higher, 5 or higher, 6 or higher, 7 or higher, 8 or higher, 9 or higher, 10 or higher, 15 or higher, or 20 or higher, and more preferably 30 or higher. An upper limit of the reflux ratio is, for example, 100 or lower, preferably 50 or lower from the point of energy cost. In a case where the number of theoretical plates of the high boiling substance removal column C is large, sufficient separation can be performed, even when the reflux ratio in the high boiling substance removal column C is about 1 or lower.

The crude 1,3-butylene glycol stream taken out from above the feed plate of the high boiling substance removal column C is fed to the alkaline reactor (e.g., a flow-through tubular reactor) D and is treated with a base (treated with alkali). The base treatment can decompose by-products contained in the crude 1,3-butylene glycol. The base is added to the alkaline reactor D or its upstream piping or the like. The base is added in an amount of, for example, from 0.05 to 10 wt. %, preferably from 0.1 to 1.0 wt. % relative to the crude 1,3-butylene glycol stream subjected to the alkaline treatment. With the added amount of the base exceeding 10 wt. %, the base would precipitate in the distillation column, piping, or the like, and this may cause blockage. In addition, the decomposition reaction of a high boiling point compound would occur, and by-products may be produced on the contrary. With the added amount of the base of lower than 0.05 wt. %, the effect of decomposing by-products is reduced.

The base added in the alkaline reactor D or its upstream piping is not particularly limited but is, for example, preferably an alkali metal compound. Examples of the alkali metal compound include sodium hydroxide, potassium hydroxide, sodium (bi)carbonate, and potassium (bi)carbonate. A basic ion exchange resin can also be used as the base. The base is preferably sodium hydroxide or potassium hydroxide from the perspective of reducing the byproducts contained in the 1,3-butylene glycol product obtained finally. The base may be added as is in the solid form but is preferably added in an aqueous solution to facilitate operation and contact with a solution to be treated. One of the bases described above may be used alone, or two or more may be used simultaneously.

The reaction temperature in the alkaline reactor D is not particularly limited but is, for example, preferably from 90 to 140° C. and more preferably from 110 to 130° C. The reaction at a reaction temperature lower than 90° C. would require long reaction residence time and thus require a reactor with a large volume and make the process uneconomical. The reaction at a reaction temperature exceeding 140° C. would increase coloration in the 1,3-butylene glycol product obtained finally. The reaction residence time is, for example, preferably from 5 to 120 minutes and more preferably from 10 to 30 minutes. A reaction residence time shorter than 5 minutes may cause an insufficient reaction and deteriorate the quality of the 1,3-butylene glycol product obtained finally. A reaction residence time exceeding 120 minutes would require a large reactor and increase the cost of equipment, and thus would be disadvantageous from the economic point of view.

After exiting the alkaline reactor D, the crude reaction liquid stream is fed to the dealkalization column (e.g., thin film evaporator) E according to need, and the base and the like are removed from the bottom of the column by evaporation. Meanwhile, from the top of the dealkalization column E is obtained a crude 1,3-butylene glycol stream after the removal of a base. The evaporator used for the dealkalization column E is suitably a natural downward flow thin-film evaporator or a forced-stirring thin-film evaporator with a short residence time for the purpose of reducing the thermal history to the process fluid. A demister may be installed in a space above the charging position of the dealkalization column (e.g., thin film evaporator) E, and droplets of a base or the like may be removed. This makes it possible to prevent the base and the high boiling point substance from being mixed into the 1,3-butylene glycol product.

Evaporation is performed in the evaporator used for the dealkalization column E, for example, under a reduced pressure at the top of the column of 20 kPa or lower (absolute pressure), preferably from 0.5 to 10 kPa (absolute pressure). The temperature of the evaporator is, for example, preferably from 90 to 120° C. The crude 1,3-butylene glycol stream containing a low boiling point substance distilled off from the top of the column is fed to the product distillation column (product column) F.

Note that the alkaline reactor D and the dealkalization column E may be installed between the desalting column B and the high boiling substance removal column C, or between the dehydration column A and the desalting column B (in this case, the desalting column may also serve as a dealkalization column), or before the dehydration column A. In addition, without providing the alkaline reactor D or the dealkalization column E, the alkaline treatment can be performed by adding the base into a high boiling substance removal column charging line or into a dehydration column charging line, or adding the base to the reaction solution after the hydrogenation [and then charging the dealcoholization column (low boiling substance removal column) with the solution].

In the manufacturing method of the present disclosure, in the product column F for use in the product distillation, a 1,3-butylene glycol liquid feed with an acetaldehyde content of 500 ppm or lower and a crotonaldehyde content of 200 ppm or lower is distilled under a condition of a reflux ratio of higher than 0.1, a liquid concentrated with a low boiling point component is distilled off from above a feed plate (corresponding to "X-6" in FIG. 1), and a 1,3-butylene glycol product is extracted from below the feed plate (corresponding to "Y" in FIG. 1).

The product column F can be, for example, a perforated-plate column, a bubble column, or the like, but is more preferably a packed column with a low pressure loss, filled with Sulzer Packing, Melapack (trade names owned by Sumitomo Heavy Industries, Ltd.). This is because 1,3-butylene glycol and trace impurities would be thermally decomposed at a high temperature (e.g., 150° C. or higher) and produce a low boiling point substance, which is a coloring component, and thus the distillation temperature is to be lowered. In addition, this is also because a long thermal history (residence time) for 1,3-butylene glycol would also have a similar effect. Thus, the reboiler employed is preferably one with a short residence time of the process side fluid, for example, a thin-film evaporator, such as a natural downward flow thin-film evaporator or a forced-stirring thin-film evaporator.

The number of theoretical plates of the product column F is, for example, from 1 to 100 plates, preferably from 2 to 90 plates, from 3 to 80 plates, from 4 to 70 plates, from 5 to 60 plates, from 8 to 50 plates, or from 10 to 40 plates, and more preferably from 15 to 30 plates. A feed position for the liquid feed is, for example, from 10 to 90%, preferably from 20 to 80%, and more preferably from 30 to 70%, and even more preferably from 40 to 60% of a height of the column downward from the top of the column. During the distillation in the product distillation column F, a pressure (absolute pressure) at the top of the column is, for example, from 20 kPa or lower, preferably from 0.1 to 10 kPa, more preferably from 0.3 to 8 kPa, and even more preferably from 0.5 to 5 kPa.

In FIG. 1, in charging the product column F, the column top vapor from the dealkalization column E is condensed in the condenser E-1, and the resulting condensed liquid is fed, but the column top vapor from the dealkalization column E may be directly fed to the product column F.

The concentration of 1,3-butylene glycol in the liquid feed (1,3-butylene glycol liquid feed) into the product column F is, for example, 90% or higher, preferably 92% or higher, more preferably 95% or higher, even more preferably 97% or higher, 97.1% or higher, 97.2% or higher, 97.3% or higher, 97.4% or higher, 97.5% or higher, 97.6% or higher, 97.7% or higher, 97.8% or higher, 97.9% or higher, 98% or higher, 98.1% or higher, 98.2% or higher, 98.3% or higher, 98.4% or higher, 98.5% or higher, 98.6% or higher, 98.7% or higher, 98.8% or higher, or 98.9% or higher, and particularly preferably 99% or higher. When the number of theoretical plates, the reflux amount, and the reflux ratio of the product column F are sufficient, 1,3-butylene glycol can be commercialized even if the concentration of 1,3-butylene glycol in the liquid feed into the product column F is lower than 90%.

The concentration of 1,3-butylene glycol in the liquid feed into the product column F can be improved, for example, by adjusting the distillation conditions of the dehydration column A, providing a dealcoholization column (low boiling substance removal column) before the dehydration column A, and adjusting the distillation conditions thereof, or adjusting the distillation conditions of the high boiling substance removal column C. For example, it is possible to increase the purity of 1,3-butylene glycol in liquid feed into the product column F by increasing the reflux ratio of the dealcoholization column (low boiling substance removal column), the dehydration column A, and/or the high boiling substance removal column C or increasing the number of plates.

Note that the concentration of 1,3-butylene glycol in the liquid feed into the product column F is an area proportion (area %) of the 1,3-butylene glycol peak relative to the total peak area in the gas chromatographic (GC) analysis of the following conditions.

Conditions for the gas chromatographic analysis are as follows:

Analytical Column: a column with dimethylpolysiloxane as a stationary phase, having a length of 30 m, an inner diameter of 0.25 mm, and a film thickness of 1.0 μm Heating Conditions: heating from 80° C. to 120° C. at 5° C./min, then heating again to 160° C. at 2° C./min and maintaining for 2 minutes, and further heating to 230° C. at 10° C./min and maintaining at 230° C. for 18 minutes Sample Introduction Temperature: 250° C.

Carrier Gas: helium

Column Gas Flow Rate: 1 mL/min

Detector and Detection Temperature: a flame ionization detector (FID), 280° C.

In the manufacturing method of the present disclosure, the content of acetaldehyde in the liquid feed into the product column F is 500 ppm or lower, and the content of crotonaldehyde therein is 200 ppm or lower. The content of acetaldehyde in liquid feed into the product column F is preferably 205 ppm or lower (e.g., 200 ppm or lower), more preferably 150 ppm or lower, even more preferably 120 ppm or lower, 100 ppm or lower, 90 ppm or lower, 80 ppm or lower, 70 ppm or lower, 60 ppm or lower, 50 ppm or lower, 40 ppm or lower, 30 ppm or lower, 20 ppm or lower or 10 ppm or lower, and particularly preferably 5 ppm or lower, and may be lower than 2 ppm. The content of the crotonaldehyde in the liquid feed into the product column F is preferably 150 ppm or lower, more preferably 130 ppm or lower, even more preferably 110 ppm or lower, 100 ppm or lower, 80 ppm or lower, 70 ppm or lower, 60 ppm or lower, 50 ppm or lower, 40 ppm or lower, 30 ppm or lower, 20 ppm or lower, 10 ppm or lower, 5 ppm or lower or 3 ppm or lower, and particularly preferably 2 ppm or lower, and may be lower than 1 ppm. The acetaldehyde content and the crotonaldehyde content in the liquid feed into the product column F can be reduced, for example, by providing a dealcoholization column (low boiling substance removal column) and a dehydration column upstream of the product column F, and adjusting the distillation conditions of the dealcoholization column (low boiling substance removal column) and the dehydration column. For example, increasing the reflux ratio and the number of plates, and the distillation rate in the dealcoholization column (low boiling substance removal column) and the dehydration column can reduce the acetaldehyde content and the crotonaldehyde content of the liquid feed into the product column F. In addition, the acetaldehyde content and the crotonaldehyde content in the liquid feed into the product column F can be reduced by increasing the reaction temperature, increasing the residence time, or increasing the added amount of the base, in the alkaline reaction. Note that the acetaldehyde content and the crotonaldehyde content of the liquid feed into the product column F can be quantified by GC-MS analysis (gas mass spectrometry).

In the manufacturing method of the present disclosure, the content of water in the liquid feed into the product column F is, for example, 3 wt. % or lower, preferably 2.8 wt. % or lower, more preferably 2.6 wt. % or lower, even more preferably 2.4 wt. % or lower, 2.2 wt. % or lower, 2 wt. % or lower, 1.8 wt. % or lower, 1.6 wt. % or lower, 1.4 wt. % or lower, 1.2 wt. % or lower, 1.1 wt. % or lower, 1.0 wt. % or lower, 0.95 wt. % or lower, 0.9 wt. % or lower, 0.8 wt. % or lower, 0.7 wt. % or lower, 0.6 wt. % or lower, 0.5 wt. % or lower, 0.4 wt. % or lower, 0.3 wt. % or lower, or 0.2 wt. % or lower, and particularly preferably 0.1 wt. % or lower. The content of water in the liquid feed into the product column F can be reduced by adjusting the distillation conditions of the dehydration column A. For example, increasing the reflux ratio and the number of plates, and the distillation rate in the dehydration column A can reduce the concentration of water in the liquid feed into the product column F. Note that the water content of the liquid feed into the product column F can be quantified by the Karl Fischer moisture measurement instrument.

The content of the low boiling point component (excluding water) in the liquid feed into the product column F is, for example, 1.8% or lower, preferably 1.6% or lower, more preferably 1.4% or lower, more preferably 1.2% or lower, 1.1% or lower, 1% or lower, 0.9% or lower, 0.8% or lower, 0.7% or lower, 0.6% or lower, 0.5% or lower, 0.4% or lower, 0.3% or lower or 0.2% or lower, and particularly preferably 0.1% or lower. The content of the low boiling point component (also referred to as "low boiling point substance") excluding water in the liquid feed into the product column F is a total area proportion (area %) of peaks of having shorter retention times than the peak of 1,3-butylene glycol relative to the total peak area in the gas chromatographic analysis under the above conditions. The content of the low boiling point component (excluding water) in the liquid feed into the product column F can be reduced, for example, by providing a dealcoholization column (low boiling substance removal column) upstream of the product column F, and adjusting the distillation conditions of the dealcoholization column (low boiling substance removal column). For example, increasing the reflux ratio and the number of plates, and the distillation rate in the dealcoholization column (low boiling substance removal column) can reduce the concentration of the low boiling point component (excluding water) in the liquid feed into the product column F.

In the manufacturing method of the present disclosure, the reflux ratio in the product column F [product column reflux amount/product column distilled amount (discharge amount to outside of distillation column)] is higher than 0.1 (e.g., 0.15 or higher). The reflux ratio is preferably 0.2 or higher, more preferably 0.3 or higher, even more preferably 0.4 or higher, 0.5 or higher, 1 or higher, 2 or higher, 3 or higher, 4 or higher, 5 or higher, 6 or higher, 7 or higher, 8 or higher, 9 or higher, 10 or higher, 20 or higher, or 50 or higher, and particularly preferably 400 or higher (for example, 500 or higher), from the perspective of increasing the initial boiling point of the 1,3-butylene glycol product.

In the manufacturing method of the present disclosure, the concentration of 1,3-butylene glycol, the content of acetaldehyde, the content of crotonaldehyde, and the content of water in the liquid feed into the dehydration column A are within the predetermined ranges; the reflux ratio in the dehydration column A is the predetermined value or higher; the content of water in the liquid feed into the product column F is 1.2 wt. % or lower (preferably, the content of low boiling point components other than water in the liquid feed into the product column F is 1.8 wt. % or lower); and the reflux ratio in the product column F is within the predetermined range, and thus it is possible to manufacture high-purity 1,3-butylene glycol having a high potassium permanganate test value, a very low content of low boiling point components and a high initial boiling point, with a high recovery rate.

In the manufacturing method of the present disclosure, the distillation rate in the product column F is, for example, lower than 30 wt. %, 29 wt. % or lower, more preferably 28 wt. % or lower, even more preferably 27 wt. % or lower, 26 wt. % or lower, 25 wt. % or lower, 24 wt. % or lower, 23 wt. % or lower, 22 wt. % or lower, 21 wt. % or lower, 20 wt. % or lower, 19 wt. % or lower, 18 wt. % or lower, 17 wt. % or lower, 16 wt. % or lower, 15 wt. % or lower, 12 wt. % or lower, 10 wt. % or lower, 8 wt. % or lower, 5 wt. % or lower, 3 wt. % or lower, 2 wt. % or lower, 1 wt. % or lower, 0.8 wt. % or lower, or 0.6 wt. % or lower, and particularly preferably 0.4 wt. % or lower, from the perspective of improving the recovery rate of 1,3-butylene glycol. Note that the distillation rate refers to a proportion (wt. %) of an amount of liquid extracted from above the feed plate of the product column F (for example, the top of the column) to the outside of the distillation column (when recycled to the previous step which will be described below, including also the amount of liquid recycled) with respect to a charged amount into the product column F.

At least a portion of the liquid (hereinafter, sometimes referred to as "distillate") in which the low boiling point component is concentrated, which is extracted from above the feed plate of the product column F, may be recycled to the step prior to the product distillation step (dashed arrow illustrated on the right side of the product column F in FIG. 1). The recovery rate of 1,3-butylene glycol can be improved by recycling at least a portion of the distillate to the step prior to the product distillation step.

Examples of the step prior to the product distillation step include dehydration step and dealcoholization step (low boiling point substance removal step). Note that the dealcoholization (low boiling substance removal) is preferably provided before the dehydration.

The amount of the distillate recycled to the step prior to the product distillation can be appropriately selected within the range of the amount of distillate. The amount of the distillate recycle to the step prior to the product distillation step is lower than 30 wt. %, for example, with respect to the charged amount into the product column F. Also, from the perspective of improving the 1,3 BG recovery rate in the product column and the yield throughout the process, the amount of the distillate recycled to the step prior to the product distillation step is, for example, 0.01 wt. % or higher, preferably 0.05 wt. % or higher, more preferably 0.1 wt. % or higher, 0.5 wt. % or higher, 1 wt. % or higher, 1.5 wt. % or higher, 2 wt. % or higher, 3 wt. % or higher, 4 wt. % or higher, 5 wt. % or higher, 7 wt. % or higher, or 10 wt.

% or higher, and particularly preferably 20 wt. % or higher with respect to the charged amount into the product column F.

Thus, according to the manufacturing method of the present disclosure, it is possible to manufacture high-purity 1,3-butylene glycol having a high potassium permanganate test value, a very low content of low boiling point components, and a high initial boiling point with a high recovery rate.

The recovery rate of 1,3 BG in the product column F is, for example, higher than 80%, preferably 85% or higher, more preferably 90% or higher, even more preferably 95% or higher, and particularly preferably 99% or higher.

Note that, in the present specification, the recovery rate of 1,3 BG in the product column F is a value (%) determined by the following formula.

{1−[GC area % of 1,3 BG in distillate]×(distilled amount (part)−amount (part) of distillate recycled]/(GC area % of 1,3 BG in liquid feed× charged amount (part)}×100

Note that, as described above, the low boiling point substance and the high boiling point substance may be hydrolyzed by water to produce 1,3 BG, while the high boiling point substance may be produced by polymerization of 1,3 BG. Thus, the mass balance in the product column may not always be made.

1,3-Butylene Glycol Product

The 1,3-butylene glycol product of the present disclosure can be obtained by the manufacturing method of the present disclosure. The 1,3-butylene glycol product of the present disclosure has an initial boiling point of higher than 203° C. and a potassium permanganate test value (PMT) of 30 minutes or longer. The initial boiling point is preferably 204° C. or higher, more preferably 205° C. or higher, even more preferably 206° C. or higher or 207° C. or higher, and particularly preferably 208° C. or higher. The potassium permanganate test value (PMT) is preferably longer than 30 minutes (e.g., 32 minutes or longer), more preferably 35 minutes or longer, even more preferably 40 minutes or longer, and particularly preferably 50 minutes or longer (especially, 60 minutes or longer).

Additionally, in the 1,3-butylene glycol product of the present disclosure, the peak area ratio of 1,3-butylene glycol is preferably higher than 98.7% in the gas chromatographic analysis (GC analysis) under the following conditions. Furthermore, the total area ratio of peaks having shorter retention times than the 1,3-butylene glycol peak is preferably lower than 0.3%.

Conditions for the gas chromatographic analysis are as follows:
Analytical Column: a column with dimethylpolysiloxane as a stationary phase, having a length of 30 m, an inner diameter of 0.25 mm, and a film thickness of 1.0 μm
Heating Conditions: heating from 80° C. to 120° C. at 5° C./min, then heating again to 160° C. at 2° C./min and maintaining for 2 minutes, and further heating to 230° C. at 10° C./min and maintaining at 230° C. for 18 minutes
Sample Introduction Temperature: 250° C.
Carrier Gas: helium
Column Gas Flow Rate: 1 mL/min
Detector and Detection Temperature: a flame ionization detector (FID), 280° C.

The area ratio of the 1,3-butylene glycol peak is preferably 98.8% or higher, more preferably 98.9% or higher, even more preferably 99% or higher, 99.1% or higher, 99.2% or higher, or 99.3% or higher, more preferably 99.4% or higher, 99.5% or higher, or 99.6% or higher, or 99.7% or higher, and particularly preferably 99.8% or higher.

The total area ratio of peaks having shorter retention times than the peak of 1,3-butylene glycol is preferably 0.28% or lower, more preferably 0.25% or lower, even more preferably 0.23% or lower, 0.2% or lower, 0.17% or lower, 0.15% or lower, 0.12% or lower, 0.1% or lower, 0.07% or lower, 0.04% or lower, 0.03% or lower, 0.02% or lower, 0.01% or lower, or 0.007% or lower, and particularly preferably 0.005% or lower (for example, 0.002% or lower).

In the present disclosure, the "(peak) area ratio" means an area proportion (area %) of a specific peak relative to the sum of the areas of all peaks appearing in the chromatogram. In addition, all peaks mean, for example, all of the peaks appearing in the analysis continued until and discontinued at a relative retention time of 7.8, provided that the relative retention time of 1,3-butylene glycol is 1.0.

Also, in the 1,3-butylene glycol product of the present disclosure, a content of water is preferably lower than 0.4 wt. %. The content of water is more preferably 0.3 wt. % or lower, even more preferably 0.2 wt. % or lower, 0.1 wt. % or lower, 0.07 wt. % or lower, 0.05 wt. % or lower, 0.03 wt. % or lower, 0.02 wt. % or lower, or 0.01 wt. % or lower, and particularly preferably 0.005 wt. % or lower. Note that the content of water can be quantified by a Karl Fischer moisture Further, in the 1,3-butylene glycol product of the present disclosure, a content of acetaldehyde is preferably lower than 2 ppm. Furthermore, the content of the crotonaldehyde is preferably lower than 1.2 ppm. The acetaldehyde content and the crotonaldehyde content of the 1,3-butylene glycol product can be quantified by GC-MS analysis (gas mass analysis), for example GC-MS analysis under the following conditions. In GC-MS analysis, even very small peaks are all subjected to mass spectrometry, and each component is quantified. Since the analysis is performed for a specific mass, a substance different in mass is not detected even when another impurity overlaps the peak. Therefore, the analysis is more sensitive than GC analysis which will be described below. In the present specification, the unit "ppm" of the content of each component by GC-MS analysis [content of each compound or the like represented by Formula (A) or (B)] means "ppm by weight".

Conditions for GC-MS Analysis
Analytical Column: a column with dimethylpolysiloxane as a stationary phase, having a length of 30 m, an inner diameter of 0.25 mm, and a film thickness of 1.0 μm
Heating Conditions: heating from 80° C. to 120° C. at 5° C./min, then heating again to 160° C. at 2° C./min and maintaining for 2 minutes, and further heating to 230° C. at 10° C./min and maintaining at 230° C. for 18 minutes
Sample Introduction Temperature: 250° C.
Carrier Gas: helium
Column Gas Flow Rate: 1 mL/min
Ion Source Temperature: EI 230° C., CI 250° C.
Q Pole Temperature: 150° C.
Sample: subjected to analysis as it was When the relative retention time of the peak of 1,3-butylene glycol is 1.0 in the GC-MS analysis conditions, a relative retention time of a peak of acetaldehyde is from 0.3 to 0.5, and a relative retention time of a peak of crotonaldehyde is from 0.3 to 0.5.

The acetaldehyde content of the 1,3-butylene glycol product is more preferably 1.8 ppm or lower, even more preferably 1.7 ppm or lower, 1.5 ppm or lower, 1.4 ppm or lower, 1.3 ppm or lower, 1.2 ppm or lower, 1.0 ppm or lower, 1.1 ppm or lower, 0.9 ppm or lower, 0.8 ppm or lower, 0.7 ppm or lower, 0.6 ppm or lower, or 0.5 ppm or lower, and particularly preferably 0.3 ppm or lower (e. g., 0.2 ppm or lower). Furthermore, the crotonaldehyde content of the 1,3-butylene glycol product is more preferably 1.0 ppm or lower, even more preferably 0.9 ppm or lower, 0.8 ppm or lower, 0.7 ppm or lower, 0.6 ppm or lower, 0.5 ppm or lower, 0.4 ppm or lower, or 0.3 ppm or lower, and particularly preferably 0.2 ppm or lower (e.g., 0.1 ppm or lower).

With the initial boiling point and potassium permanganate test value within the above ranges, and further, preferably with the area ratio of the 1,3-butylene glycol peak, the total area ratio of the peaks having shorter retention times than the 1,3-butylene glycol peak, the acetaldehyde content, and the crotonaldehyde content also within the above ranges, a high-quality and high-quality 1,3-butylene glycol product is provided.

Moisturizer and Cosmetic Product

A moisturizer of the present disclosure contains the 1,3-butylene glycol product described above. Therefore, the moisturizer has excellent moisturizing performance. The moisturizer of the present disclosure may contain a component other than the 1,3-butylene glycol product described above, such as a moisturizer component other than the 1,3-butylene glycol product described above. In the moisturizer of the present disclosure, the content of the 1,3-butylene glycol product described above is, for example, 10 wt. % or higher, preferably 30 wt. % or higher, more preferably 50 wt. % or higher, even more preferably 80 wt. % or higher, and particularly preferably 90 wt. % or higher, and the moisturizer may contain only the 1,3-butylene glycol product described above.

A cosmetic of the present disclosure contains the moisturizer described above. The blending amount of the 1,3-butylene glycol product in the cosmetic product of the present disclosure is any amount in which the moisturizing performance can be exhibited according to the type and form of cosmetic. The blending amount of the 1,3-butylene glycol product in the cosmetic product of the present disclosure is, for example, from 0.01 to 40 wt. %, preferably from 0.1 to 30 wt. %, more preferably from 0.2 to 20 wt. %, even more preferably from 0.5 to 15 wt. %, and particularly preferably from 1 to 10 wt. %.

The cosmetic product of the present disclosure may contain, in addition to the 1,3-butylene glycol product, for example, another moisturizer; an oil, such as a vegetable oil, a hydrocarbon oil, a higher fatty acid, a higher alcohol, or a silicone; a surfactant, such as an anionic surfactant, a cationic surfactant, an amphoteric surfactant, or a nonionic surfactant; a preservative, a sequestrant, a thickener, a powder, an ultraviolet absorber, an ultraviolet blocker, a fragrance, or a pH adjuster; or a medicinal ingredient or bioactive component, such as a vitamin preparation, a skin activator, a blood circulation promoter, a skin-lightening preparation, an antibacterial agent, or an anti-inflammatory agent.

The cosmetic product of the present disclosure can be a skin cosmetic product, such as a lotion, an emulsion, a cream, a gel, a pack, or a mask; or a hair cosmetic product, such as a shampoo, a rinse, or a hair restorer. In addition, the cosmetic product may be a sunscreen cosmetic product, a make-up cosmetic product or the like. Furthermore, the cosmetic product can be a pharmaceutical product or quasi drug containing a medical component.

The cosmetic product of the present disclosure can be manufactured by utilizing a method known per se.

Each aspect disclosed in the present specification can be combined with any other feature disclosed herein. Note that each of the configurations, combinations thereof, and the like in each of the embodiments are an example, and various additions, omissions, and other changes may be made as appropriate without departing from the spirit of the present disclosure. The present disclosure is not limited by the embodiments and is limited only by the claims.

EXAMPLES

Hereinafter, the present disclosure will be described more specifically with reference to examples, but the present disclosure is not limited by these examples. "Parts" used in the examples means "parts by weight" unless otherwise specified. Gas chromatographic analysis (GC analysis), initial boiling point measurement, and moisture measurement were performed according to the methods which will be described below.

Example 1

The method of manufacturing 1,3-butylene glycol will be described using FIG. 1.

Relative to 100 parts of an acetaldol solution containing 30 wt. % of water (mixed solution of 69 parts of acetaldol and 29 parts of water, containing a total of 2 parts of low boiling and high boiling impurities, Na salt: lower than 0.1 parts) as a raw material, 10 parts of hydrogen were charged into a reactor for liquid-phase hydrogen reduction, and 15 parts of Raney nickel were added as a catalyst. The reactor was kept at 120° C. and 10 MPa (gauge pressure), and liquid-phase hydrogen reduction was performed. After the catalyst was separated, the liquid after the reaction was neutralized with sodium hydroxide, and crude 1,3-butylene glycol (1) containing low boiling impurities and water was obtained.

Note that the acetaldol solution containing 30 wt. % of water used as the raw material was manufactured by stirring acetaldehyde and water in the presence of 100 ppm by weight NaOH at 30° C. at a residence time of 10 hours and dimerizing the acetaldehyde [acetaldehyde polymerization (aldol condensation of acetaldehyde)].

The crude 1,3-butylene glycol (1) (corresponding to "X-1" in FIG. 1) was charged into the dehydration column A. In the liquid feed into the dehydration column A, the 1,3-butylene glycol concentration was 56 wt. %, the water concentration was 40 wt. %, the acetaldehyde (AD) content was 130 ppm, the crotonaldehyde (CR) content was 89 ppm, and the content of other components was 4 wt. %. In the dehydration column A, the liquid feed containing 1,3-butylene glycol was distilled under conditions of a pressure at the top of 10 kPa (absolute pressure) and a reflux ratio of 1, water was extracted from the top of the column, and 43 parts (distilled amount) was discharged and removed to the outside of the system relative to 100 parts of the liquid feed amount (corresponding to "X-2" in FIG. 1). From the bottom of the column, obtained was crude 1,3-butylene glycol (2) having a water content of 0.9 wt. % and a total area ratio of impurity peaks having shorter retention times (RT) than 1,3-butylene glycol of 0.8%, according to GC analysis which will be described later.

The crude 1,3-butylene glycol (2) was then charged into the desalting column B. In the desalting column B, a salt, a high boiling point substance, and a portion of 1,3-butylene glycol were discharged as the evaporation residue from the bottom of the column (corresponding to "X-3" in FIG. 1). The discharge amount of the evaporation residue was 5 parts relative to 100 parts of the liquid feed amount. Meanwhile, from the top of the column was obtained crude 1,3-butylene glycol (3) containing 1,3-butylene glycol, a low boiling point substance, and a portion of a high boiling point substance.

The crude 1,3-butylene glycol (3) was then charged into the high boiling substance removal column C. In the high boiling substance removal column C, distillation was performed under a condition of a pressure at the top of the column of 5 kPa (absolute pressure), and a high boiling point substance and a portion of 1,3-butylene glycol were discharged from the bottom of the column (corresponding to "X-4" in FIG. 1). The discharge amount from the bottom of the column was 20 parts relative to 100 parts of the liquid feed amount. Meanwhile, 80 parts of crude 1,3-butylene glycol (4) containing a low boiling point substance was obtained, as a distillate, from the top of the column.

The crude 1,3-butylene glycol (4) was then charged into the alkaline reactor D. At this time, a 20 wt. % sodium hydroxide aqueous solution was added to give a concentration of sodium hydroxide of 0.1 wt. % relative to the liquid feed. The reaction temperature was maintained at 120° C. in the alkaline reactor D, and a reaction was performed at a residence time of 20 minutes.

A crude reaction liquid exiting the alkaline reactor D was then charged into the dealkalization column E. In the dealkalization column E, sodium hydroxide, a high boiling point substance, and a portion of 1,3-butylene glycol were discharged from the bottom of the column (corresponding to "X-5" in FIG. 1). The discharge amount from the bottom of the column was 10 parts relative to 100 parts of the liquid feed amount. Meanwhile, from the top of the column were obtained 90 parts of crude 1,3-butylene glycol (5) containing 1,3-butylene glycol and a low boiling point substance. The crude 1,3-butylene glycol (5) containing 1,3-butylene glycol and a low boiling point substance was measured for moisture, and subjected to GC analysis and GC-MS analysis. As a result, the moisture concentration was 1 wt. %, the area ratio of 1,3-butylene glycol was 99%, the total area ratio of impurity peaks having shorter retention times than 1,3-butylene glycol was 0.4%, the acetaldehyde content was 20 ppm, and the crotonaldehyde content was 9 ppm.

The crude 1,3-butylene glycol (5) was then charged into the product column F. In the product column F, 10 parts of the low boiling point substance and a portion of 1,3-butylene glycol relative to 100 parts of the liquid feed amount were distilled off from the top of the column (corresponding to "X-6" in FIG. 1), and the entire amount was discharged to the outside of the system. The operation was performed at a reflux ratio (reflux amount/distilled amount) of 0.5 at that time, and 90 parts of a 1,3-butylene glycol product was obtained from the bottom of the column (distilled amount: 10 parts) (corresponding to "Y" in FIG. 1).

The obtained 1,3-butylene glycol product was measured for initial boiling point and moisture, and subjected to GC analysis and GC-MS analysis. As a result, the initial boiling point was 203.3° C., the moisture concentration was 0.2 wt. %, the area ratio of 1,3-butylene glycol was 99.2%, the total area ratio of impurity peaks having shorter retention times than 1,3-butylene glycol was 0.08%, the acetaldehyde content was 1.5 ppm, and the crotonaldehyde content was 0.9 ppm. The potassium permanganate test value was 35 minutes. The 1,3-butylene glycol recovery rate in the product column F was 90%.

Example 2

The same operation as in Example 1 was performed except that the reflux ratio in the dehydration column A was changed to 50. A 1,3-butylene glycol product was obtained from the bottom of the product column F. Note that, due to the changes in conditions employed in the dehydration column A, the dehydration column bottom composition changed, and the liquid feed compositions in the high boiling substance removal column C and the product column F changed. As a result, the product qualities changed.

The obtained 1,3-butylene glycol product was measured for initial boiling point and moisture, and subjected to GC analysis and GC-MS analysis. As a result, the initial boiling point was 206.7° C., the moisture concentration was 0.1 wt. %, the area ratio of 1,3-butylene glycol was 99.3%, the total area ratio of impurity peaks having shorter retention times than 1,3-butylene glycol was 0.05%, the acetaldehyde content was 0.7 ppm, and the crotonaldehyde content was 0.7 ppm. The potassium permanganate test value was 45 minutes. The 1,3-butylene glycol recovery rate in the product column F was 90%.

Example 3 to 18

Under the conditions shown in Table 1 and Table 2, the dehydration column A and the product column F were operated. Note that, in Examples 4 to 15, 17 and 18, the entire amount of the distillate from the product column F was recycled into a hydrogen reduction reactor.

Comparative Example 1

Eighty (80) parts of a 1,3-butylene glycol product was obtained from the bottom of the product column F by the same method as in Example 1 except that the charged composition in the dehydration column A was changed, that the reflux ratio in the dehydration column A was changed to 0.3, that the distilled amount therein was changed to 42 parts, that the reflux ratio in the product column F was changed to 0.1, and that the distilled amount therein was changed to 20 parts. The obtained 1,3-butylene glycol product had an initial boiling point of 193.2° C., a moisture concentration of 0.6 wt. %, an area ratio of 1,3-butylene glycol of 98.5%, a total area ratio of impurity peaks having shorter retention times than 1,3-butylene glycol of 0.3%, an acetaldehyde content of 5 ppm, and a crotonaldehyde content of 4 ppm. The potassium permanganate test value was 0 minutes. The 1,3-butylene glycol recovery rate in the product column F was 82%.

Comparative Example 2

Eighty (80) parts of a 1,3-butylene glycol product was obtained from the bottom of the product column F by the same method as in Example 1 except that the charged composition in the dehydration column A was changed, that the reflux ratio therein was changed to 0.3, that the distilled amount therein was changed to 32 parts, that the reflux ratio in the product column F was changed to 0.1, and that the distilled amount therein was changed to 20 parts. The obtained 1,3-butylene glycol product had an initial boiling point of 199.0° C., a moisture concentration of 0.4 wt. %, an area ratio of 1,3-butylene glycol of 98.6%, a total area ratio of impurity peaks having shorter retention times than 1,3-butylene glycol of 0.2%, an acetaldehyde content of 4 ppm, and a crotonaldehyde content of 3 ppm. The potassium permanganate test value was 5 minutes. The 1,3-butylene glycol recovery rate in the product column F was 82%.

Comparative Example 3

Seventy (70) parts of a 1,3-butylene glycol product was obtained from the bottom of the product column F by the same method as in Example 1 except that the charged composition in the dehydration column A was changed, that the reflux ratio therein was changed to 0.3, that the distilled amount therein was changed to 32 parts, that the reflux ratio in the product column F was changed to 0.1, and that the distilled amount therein was changed to 30 parts. The obtained 1,3-butylene glycol product had an initial boiling point of 203.0° C., a moisture concentration of 0.2 wt. %, an area ratio of 1,3-butylene glycol of 98.7%, a total area ratio of impurity peaks having shorter retention times than 1,3-butylene glycol of 0.1%, an acetaldehyde content of 2 ppm, and a crotonaldehyde content of 1.2 ppm. The potassium permanganate test value was 30 minutes. The 1,3-butylene glycol recovery rate in the product column F was 72%.

Comparative Example 4

Eighty (80) parts of a 1,3-butylene glycol product was obtained from the bottom of the product column F by the same method as in Example 1 except that the charged composition in the dehydration column A was changed, that the reflux ratio therein was changed to 0.3, that the distilled amount therein was changed to 23 parts, that the reflux ratio in the product column F was changed to 0.1, and that the distilled amount therein was changed to 20 parts. The obtained 1,3-butylene glycol product had an initial boiling point of 203.0° C., a moisture concentration of 0.2 wt. %, an area ratio of 1,3-butylene glycol of 98.7%, a total area ratio of impurity peaks having shorter retention times than 1,3-butylene glycol of 0.1%, an acetaldehyde content of 2 ppm, and a crotonaldehyde content of 1.2 ppm. The potassium permanganate test value was 30 minutes. The 1,3-butylene glycol recovery rate in the product column F was 81%.

Gas Chromatographic Analysis

Figure 2:
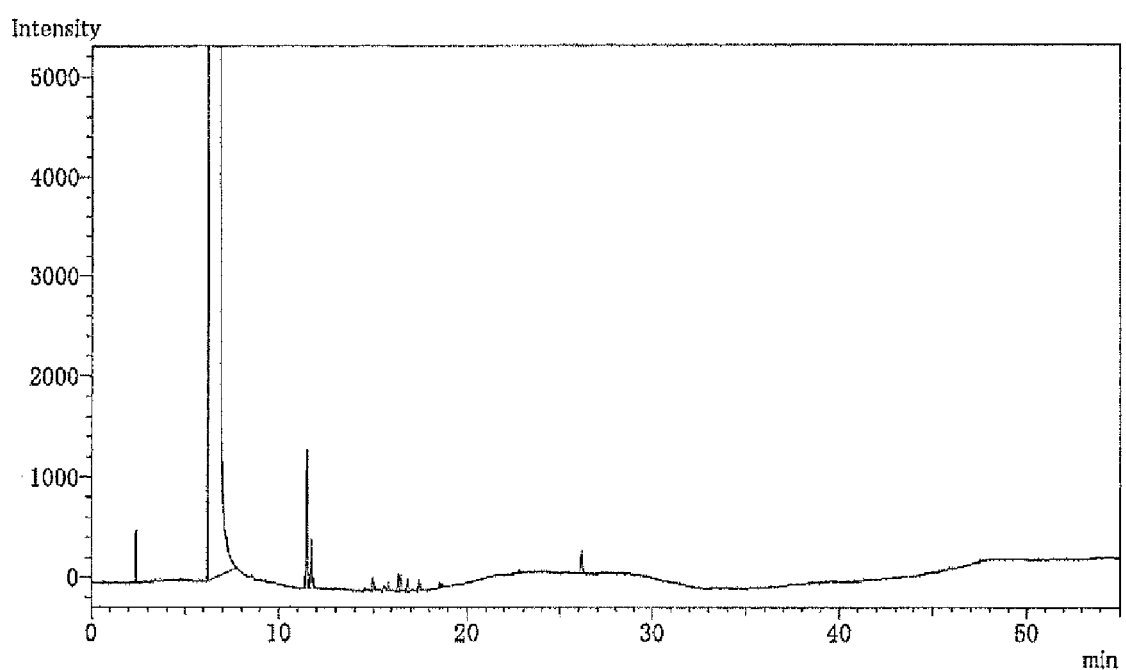
FIG. 2 is a chromatogram showing a gas chromatographic analysis for a 1,3-butylene glycol product in Example 3.
Figure 3:
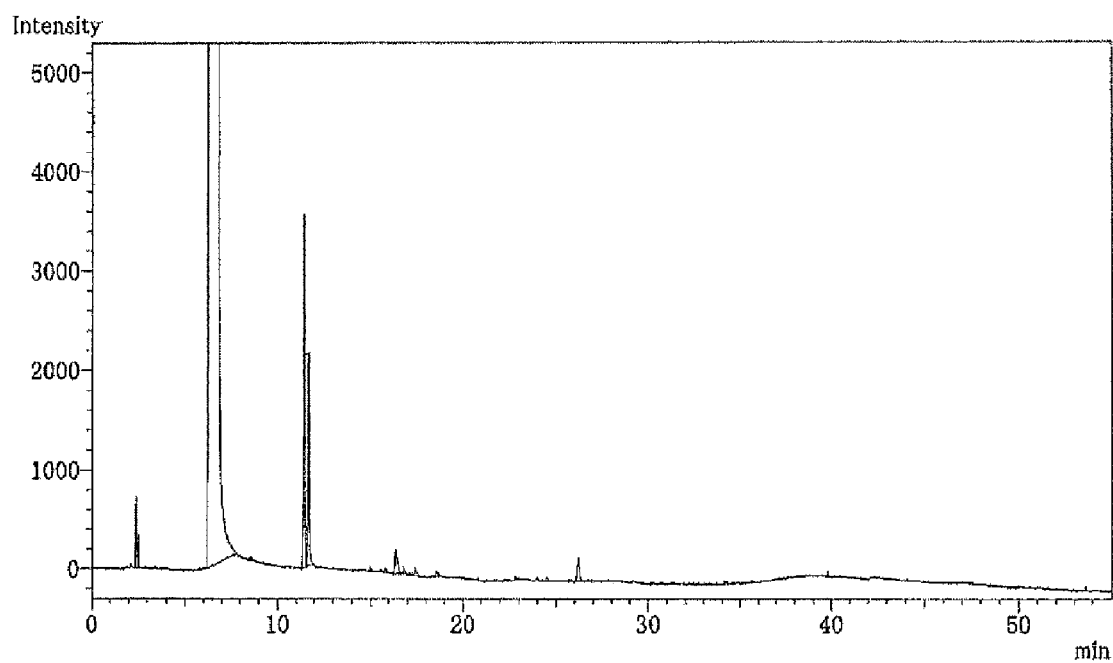
FIG. 3 is a chromatogram showing a gas chromatographic analysis for a 1,3-butylene glycol product in Comparative Example 2.

A gas chromatographic analysis of the target 1,3-butylene glycol product was performed under the conditions below. A chromatogram of the gas chromatographic analysis of the 1,3-butylene glycol product in Example 3 is shown in FIG. 2. In addition, a chromatogram of the gas chromatographic analysis of the 1,3-butylene glycol product in Comparative Example 2 is shown in FIG. 3.

Conditions for the gas chromatographic analysis are as follows:

Analytical Instrument: Shimadzu GC 2010
Analytical Column: column with dimethylpolysiloxane as a stationary phase (a length of 30 m, an inner diameter of 0.25 mm, and a film thickness of 1.0 μm) (Agilent J&W GC column—DB-1, available from Agilent Technologies Japan, Ltd.)
Heating Conditions: heating from 80° C. to 120° C. at 5° C./min, then heating again to 160° C. at 2° C./min and maintaining for 2 minutes, and further heating to 230° C. at 10° C./min and maintaining at 230° C. for 18 minutes
Sample Introduction and Temperature: split sample introduction, 250° C.
Gas Flow Rate of Split and Carrier Gas: 23 mL/min, helium
Column Gas Flow Rate and Carrier Gas: 1 mL/min, helium
Detector and Temperature: a flame ionization detector (FID), 280° C.
Injection Sample: 0.2 μL of a 80 wt. % 1,3-butylene glycol product aqueous solution Measurement of Initial Boiling Point Measurement was made according to the test method specified in the normal pressure distillation test method of JIS K2254 "Petroleum products—distillation test method".

Measurement of Moisture

Measurement was made using a Karl Fischer moisture measurement instrument.

GC-MS Analysis

Analytical Instrument: Agilent 6890A-GC/5973A-MSD
Analytical Column: a column with dimethylpolysiloxane as a stationary phase, having a length of 30 m, an inner diameter of 0.25 mm, and a film thickness of 1.0 μm
Heating conditions: heating from 80° C. to 120° C. at 5° C./min, then heating again to 160° C. at 2° C./min and maintaining for 2 minutes, and further heating to 230° C. at 10° C./min and maintaining at 230° C. for 18 minutes
Sample Introduction Temperature: 250° C.
Carrier Gas: helium
Column Gas Flow Rate: 1 mL/min
Ion source temperature: EI 230° C., CI 250° C.
Q Pole temperature: 150° C.
Sample: subjected to analysis as it was Potassium Permanganate Test In the present specification, the potassium permanganate test value (PMT) is a value measured in accordance with the visual colorimetric procedure of JIS K1351 (1993).

Considerations of Results

Results of the above comparative examples and examples are shown in Table 1 and Table 2.

TABLE 1

| | | Comparative Example 1 | Comparative Example 2 | Comparative Example 3 | Comparative Example 4 | Example 1 | Example 2 | Example 3 |
|---|---|---|---|---|---|---|---|---|
| Charge into dehydration column A | Part | 100 | 100 | ← | 100 | 100 | ← | ← |
| | 1, 3 BG wt. % | 56 | 66 | ← | 76 | 56 | ← | ← |
| | Water wt. % | 40 | 30 | ← | 20 | 40 | ← | ← |
| | AD ppm | 130 | 145 | ← | 155 | 130 | ← | ← |
| | CR ppm | 89 | 110 | ← | 117 | 89 | ← | ← |
| | Others wt. % | 4 | 4 | ← | 4 | 4 | ← | ← |
| Reflux ratio of dehydration column A | | 0.3 | 0.3 | ← | 0.3 | 1 | 50 | 50 |
| Distillation from dehydration column A | Part | 42 | 32 | ← | 23 | 43 | 43 | 43 |
| 1, 3 BG recovery rate | % | 99.3 | 99.8 | ← | 99.8 | 99.6 | 99.9 or higher | 99.9 or higher |

TABLE 1-continued

| | | | | | | | | |
|---|---|---|---|---|---|---|---|---|
| Charge into product column F | Part | 100 | 100 | ← | 100 | 100 | ← | 100 |
| | 1, 3 BG GC area % | 97 | 97 | ← | 98 | 99 | 99 | 99 |
| | Water wt. % | 1.4 | 1.2 | ← | 0.9 | 1 | 0.3 | 0.3 |
| | AD ppm | 49 | 43 | ← | 38 | 20 | 9 | 9 |
| | CR ppm | 18 | 15 | ← | 15 | 9 | 6 | 6 |
| | Low boiling point substance GC area % | 1.8 | 1.8 | ← | 0.7 | 0.4 | 0.3 | 0.3 |
| Reflux ratio of product column F | | 0.1 | 0.1 | 0.1 | 0.1 | 0.5 | 0.5 | 10 |
| Distillation from product column F | Part | 20 | 20 | 30 | 20 | 10 | 10 | 1 |
| | Recycle | Absent | Absent | Absent | Absent | Absent | Absent | Absent |
| Bottom (product) from product column F | Part | 80 | 80 | 70 | 80 | 90 | 90 | 99 |
| | 1, 3 BG GC area % | 98.5 | 98.6 | 98.7 | 98.7 | 99.2 | 99.3 | 99.5 |
| | Water wt. % | 0.6 | 0.4 | 0.2 | 0.2 | 0.2 | 0.1 | 0.1 |
| | AD ppm | 5 | 4 | 2 | 2 | 1.5 | 0.7 | 1 |
| | CR ppm | 4 | 3 | 1.2 | 1.2 | 0.9 | 0.7 | 0.7 |
| | Low boiling point substance GC area % | 0.3 | 0.2 | 0.1 | 0.1 | 0.08 | 0.05 | 0.05 |
| | Initial boiling point ° C. | 193.2 | 199.0 | 203.0 | 203.0 | 203.3 | 206.7 | 206.7 |
| | PMT min | 0 | 5 | 30 | 30 | 35 | 45 | 40 |
| | 1, 3 BG recovery rate % | 82 | 82 | 72 | 81 | 90 | 90 | 99 or higher |

| | | Example 4 | Example 5 | Example 6 | Example 7 | Example 8 | Example 9 | Example 10 |
|---|---|---|---|---|---|---|---|---|
| Charge into dehydration column A | Part | 100 | ← | ← | ← | ← | ← | ← |
| | 1, 3 BG wt. % | 66 | ← | ← | ← | ← | ← | ← |
| | Water wt. % | 30 | ← | ← | ← | ← | ← | ← |
| | AD ppm | 145 | ← | ← | ← | ← | ← | ← |
| | CR ppm | 110 | ← | ← | ← | ← | ← | ← |
| | Others wt. % | 4 | ← | ← | ← | ← | ← | ← |
| Reflux ratio of dehydration column A | | 2 | 10 | 20 | 20 | 20 | 50 | 100 |
| Distillation from dehydration column A | Part | 33 | 33 | 33 | 33 | 33 | 33 | 33 |
| 1, 3 BG recovery rate | % | 99.9 | 99.9 or higher | 99.9 or higher | 99.9 or higher | 99.9 or higher | 99.9 or higher | 99.9 or higher |
| Charge into product column F | Part | 100 | ← | ← | ← | ← | ← | ← |
| | 1, 3 BG GC area % | 99 | 99 | 99 | 99 | 99 | 99 | 99 |
| | Water wt. % | 0.6 | 0.3 | 0.2 | 0.2 | 0.2 | 0.1 | 0.08 |
| | AD ppm | 29 | 16 | 10 | 11 | 9 | 3 | 2 |
| | CR ppm | 13 | 5 | 3 | 3 | 3 | 2 | 1 |
| | Low boiling point substance GC area % | 0.3 | 0.2 | 0.2 | 0.2 | 0.2 | 0.2 | 0.1 |
| Reflux ratio of product column F | | 0.5 | 0.5 | 2 | 100 | 500 | 2 | 2 |
| Distillation from product column F | Part | 10 | 10 | 1 | 1 | 1 | 1 | 1 |
| | Recycle | Present | Present | Present | Present | Present | Present | Present |
| Bottom (product) from product column F | Part | 90 | 90 | 99 | 99 | 99 | 99 | 99 |
| | 1, 3 BG GC area % | 99.4 | 99.4 | 99.4 | 99.5 | 99.5 | 99.4 | 99.5 |
| | Water wt. % | 0.2 | 0.1 | 0.1 | 0.003 | 0.002 | 0.05 | 0.04 |
| | AD ppm | 2 | 1.1 | 1 | 0.2 | lower than 0.2 | 0.3 | lower than 0.2 |
| | CR ppm | 1 | 0.7 | 0.6 | 0.1 | lower than 0.1 | 0.2 | lower than 0.1 |
| | Low boiling point substance GC area % | 0.04 | 0.03 | 0.07 | 0.004 | 0.003 | 0.06 | 0.03 |
| | Initial boiling point ° C. | 203.8 | 206.7 | 206.8 | 208.4 | 208.4 | 207.5 | 207.2 |

TABLE 1-continued

|  | | | | | | | |
|---|---|---|---|---|---|---|---|
| PMT min | 30 | 40 | 40 | 55 | 60 | 50 | 55 |
| 1, 3 BG recovery rate % | 99 or higher | 99 or higher | 99 or higher | 99 or higher | 99 or higher | 99 or higher | 99 or higher |

TABLE 2

| | | Example 11 | Example 12 | Example 13 | Example 14 | Example 15 | Example 16 | Example 17 | Example 18 |
|---|---|---|---|---|---|---|---|---|---|
| Charge into dehydration column A | Part | 100 | ← | ← | 100 | 100 | 100 | 100 | 100 |
| | 1, 3 BG wt. % | 76 | ← | ← | 56 | 66 | 76 | 9 | 66 |
| | Water wt. % | 20 | ← | ← | 40 | 30 | 20 | 90 | 30 |
| | AD ppm | 155 | ← | ← | 130 | 145 | 155 | 85 | 970 |
| | CR ppm | 117 | ← | ← | 89 | 110 | 117 | 71 | 390 |
| | Others wt. % | 4 | ← | ← | 4 | 4 | 4 | 1 | 4 |
| Reflux ratio of dehydration column A | | 2 | 10 | 100 | 0.3 | 0.3 | 0.3 | 20 | 2 |
| Distillation from dehydration column A | Part | 23 | 23 | 23 | 42 | 32 | 23 | 91 | 33 |
| 1, 3 BG recovery rate | % | 99.8 | 99.9 or higher | 99.9 or higher | 99.3 | 99.8 | 99.8 | 99.0 | 99.9 or higher |
| Charge into product column F | Part | 100 | ← | ← | 100 | 100 | 100 | 100 | 100 |
| | 1, 3 BG GC area % | 99 | ← | ← | 97 | 97 | 98 | 99 | 99 |
| | Water wt. % | 0.3 | 0.1 | 0.09 | 1.4 | 1.2 | 0.9 | 3 | 0.7 |
| | AD ppm | 22 | 12 | 1 | 49 | 43 | 38 | 7 | 205 |
| | CR ppm | 14 | 5 | 0.7 | 18 | 15 | 15 | 3 | 110 |
| | Low boiling point substance GC area % | 0.3 | 0.2 | 0.1 | 1.8 | 1.8 | 0.7 | 0.8 | 0.3 |
| Reflux ratio of product column F | | 2 | 2 | 2 | 2 | 2 | 2 | 10 | 10 |
| Distillation from product column F | Part | 10 | 1 | 1 | 10 | 10 | 10 | 10 | 10 |
| | Recycle | Present | Present | Present | Present | Present | Absent | Present | Present |
| Bottom (product) from product column F | Part | 90 | 99 | 99 | 90 | 90 | 90 | 90 | 90 |
| | 1, 3 BG GC area % | 99.4 | 99.4 | 99.5 | 98.7 | 98.8 | 98.8 | 99.4 | 99.4 |
| | Water wt. % | 0.06 | 0.05 | 0.04 | 0.2 | 0.1 | 0.08 | 0.1 | 0.02 |
| | AD ppm | 1.6 | 1 | lower than 0.2 | 1.1 | 1 | 0.9 | 0.3 | 1.2 |
| | CR ppm | 1 | 0.8 | lower than 0.1 | 1.1 | 1 | 1.1 | 0.2 | 1.1 |
| | Low boiling point substance GC area % | 0.09 | 0.07 | 0.05 | 0.06 | 0.05 | 0.03 | 0.02 | 0.004 |
| | Initial boiling point ° C. | 207.3 | 207.5 | 207.2 | 204.1 | 206.7 | 207.0 | 206.7 | 208.0 |
| | PMT min | 35 | 40 | 60 | 35 | 35 | 35 | 50 | 35 |
| | 1, 3 BG recovery rate % | 99 or higher | 99 or higher | 99 or higher | 99 or higher | 99 or higher | 99 or higher | 99 or higher | 99 or higher |

From Comparative Examples 1, 2, and 4, even though the charged composition (water, acetaldehyde, crotonaldehyde, etc.) in the dehydration column is changed, the product quality is deteriorated when the reflux ratios in the dehydration column and the product column are low. From Comparative Examples 2 and 3, low boiling impurities can be removed and the initial boiling point and potassium permanganate test value (PMT) are improved when the distilled amount in the product column is greatly increased, but the 1,3 BG recovery rate in the product column is lowered, which is not economical. Note that acetaldehyde and crotonaldehyde seem less likely to separate in the dehydration column than usual, and that acetaldehyde and crotonaldehyde can be produced in the column.

From Comparative Example 1 and Example 1, when the charged composition in the dehydration column is the same, and the reflux ratio and distilled amount in the dehydration column are increased, the low boiling impurities containing water in the bottom from the dehydration column are reduced, and, further, when the reflux ratio in the product column is a constant value or higher, the product quality is improved.

From Comparative Example 2 and Example 4, and Comparative Example 4 and Example 11, it is clear that, even when the product column distillate is recycled, the impurity content in the liquid feed into the product column are adjusted to be reduced, and the reflux ratio in the product column is increased, and thus products with favorable quality can be recovered in a high yield. When the water content of the liquid feed into the dehydration column is reduced, the water content of the bottom from the dehydration column and the water content of the liquid feed into the product column downstream thereof are reduced even when the reflux ratio in the dehydration column is the same. Thus, the water content of the product is reduced, and the initial boiling point is improved. The same applies to acetaldehyde and crotonaldehyde, but the effect was not as much as that when the water content was reduced.

From Example 1 and 2, when the reflux amount in the dehydration column is increased, the separation of acetaldehyde, crotonaldehyde, and other low boiling impurities is improved, the impurities in the liquid feed into the product column and in the product are reduced, and thus the quality of the product is improved.

From Examples 2 and 3, when the reflux ratio in the product column is increased and the distilled amount in the product column are minimized, under the same dehydration column conditions, it is possible to greatly increase the 1,3 BG recovery rate in the product column while maintaining the equivalent product quality, which is economically advantageous.

From Examples 6, 9, and 10, when the reflux ratio in the dehydration column is increased, the separation of the low boiling impurities in the dehydration column is promoted, the impurities in the liquid feed into the product column are reduced, and the quality is improved. However, the effect tends to be reduced even when the reflux ratio in the dehydration column is excessively increased. An excessive increase in reflux ratio causes an energy loss of evaporated latent heat, and thus, it is desirable to also provide an upper limit on increase in reflux ratio.

Furthermore, from Examples 6 to 8, when the reflux ratio in the product column is significantly increased, the product quality is increased greatly, but the effect tends to be reduced even when the reflux ratio in the product column is excessively increased. An excessive increase in reflux ratio causes an energy loss of evaporated latent heat, and thus, it is desirable to also provide an upper limit on increase in reflux ratio.

Similarly in Examples 11 to 13, even when the 1,3 BG concentration of the liquid feed into the dehydration column is increased, the separation of the low boiling impurities is improved when the reflux ratio in the dehydration column is increased. However, when the alkaline treatment (aqueous sodium hydroxide solution treatment) is subsequently performed, the water content of the product liquid feed does not decrease. Thus, there is also a limit on the reflux ratio when dehydration is merely intended. However, the increase in reflux ratio improves the separation of acetaldehyde and crotonaldehyde, and thus the PMT of the product tends to be improved.

From Comparative Examples 1 and 2 and Examples 14 to 16, it can be seen that, even when the reflux ratio in the dehydration column is 0.3, a high-quality product can be maintained by increasing the reflux ratio and distilled amount in the product column.

Example 17 shows that, even when the water concentration of the liquid feed into the dehydration column is significantly high, a high-quality product can be maintained by making the distilled amount and reflux ratio in the product column relatively large and high, respectively.

Example 18 shows that, even when the hydrogen addition reaction is suppressed and the content of acetaldehyde and crotonaldehyde in the liquid feed into the dehydration column are increased, the product quality can be maintained by increasing the reflux ratio in the dehydration column and the product column.

Note that, among 1,3-butylene glycol products obtained by known methods, there was no high-quality product having an initial boiling point of higher than 203° C. and a potassium permanganate test value of 30 minutes or longer.

As a summary of the above, configurations and variations of the present disclosure are described below.

[1] A method for manufacturing 1,3-butylene glycol, which is a method for obtaining purified 1,3-butylene glycol from a crude reaction liquid containing 1,3-butylene glycol, the method including:

a dehydration step of removing water by distillation; a high boiling substance removal step of removing a high boiling point component by distillation; and a product distillation step of obtaining purified 1,3-butylene glycol, wherein in the dehydration step, a dehydration column is used in which a liquid feed containing 1,3-butylene glycol and water with an acetaldehyde content of 1000 ppm or lower (or 900 ppm or lower, 800 ppm or lower, 700 ppm or lower, 600 ppm or lower, 500 ppm or lower, 400 ppm or lower, 300 ppm or lower, 200 ppm or lower, 155 ppm or lower, 140 ppm or lower, 100 ppm or lower, 90 ppm or lower, 80 ppm or lower, 70 ppm or lower, 60 ppm or lower, 50 ppm or lower, 40 ppm or lower, 30 ppm or lower, 20 ppm or lower, 10 ppm or lower, 5 ppm or lower, 3 ppm or lower, 2 ppm or lower, or 1 ppm or lower), and a crotonaldehyde content of 400 ppm or lower (or 200 ppm or lower, 150 ppm or lower, 130 ppm or lower, 117 ppm or lower, 100 ppm or lower, 90 ppm or lower, 80 ppm or lower, 70 ppm or lower, 60 ppm or lower, 50 ppm or lower, 40 ppm or lower, 30 ppm or lower, 20 ppm or lower, 10 ppm or lower, 5 ppm or lower, 3 ppm or lower, 2 ppm or lower, or 1 ppm or lower) is distilled under a condition of a reflux ratio of higher than 0.3 (or 0.4 or higher, 0.5 or higher, 0.6 or higher, 0.7 or higher, 0.8 or higher, 0.9 or higher, 1 or higher, 1.1 or higher, 1.2 or higher, 1.3 or higher, 1.4 or higher, 1.5 or higher, 1.6 or higher, 1.7 or higher, 1.8 or higher, 1.9 or higher, 2 or higher, 3 or higher, 4 or higher, 5 or higher, 6 or higher, 7 or higher, 8 9 or higher, 10 or higher, 15 or higher, 20 or higher, 25 or higher, 30 or higher, or 40 or higher), and a liquid concentrated with a low boiling point component containing water is distilled off from above a feed plate, and in the product distillation step, a product column is used in which a 1,3-butylene glycol liquid feed with an acetaldehyde content of 500 ppm or lower (or 205 ppm or lower, 200 ppm or lower, 150 ppm or lower, 120 ppm or lower, 100 ppm or lower, 90 ppm or lower, 80 ppm or lower, 70 ppm or lower, 60 ppm or lower, 50 ppm or lower, 40 ppm or lower, 30 ppm or lower, 20 ppm or lower, 10 ppm or lower, 5 ppm or lower, or lower than 2 ppm) and a crotonaldehyde content of 200 ppm or lower (or 150 ppm or lower, 130 ppm or lower, 110 ppm or lower, 100 ppm or lower, 80 ppm or lower, 70 ppm or lower, 60 ppm or lower, 50 ppm or lower, 40 ppm or lower, 30 ppm or lower, 20 ppm or lower, 10 ppm or lower, 5 ppm or lower, 3 ppm or lower, 2 ppm or lower, or lower than 1 ppm) is distilled under a condition of a reflux ratio of higher than 0.1 (or 0.15 or higher, 0.2 or higher, 0.3 or higher, 0.4 or higher, 0.5 or higher, 1 or higher, 2 or higher, 3 or higher, 4 or higher, 5 or higher, 6 or higher, 7 or higher, 8 or higher, 9 or higher, 10 or higher, 20 or higher, 50 or higher, 400 or higher, or 500 or higher), a liquid concentrated with a low boiling point component is distilled off from above a feed plate, and 1,3-butylene glycol is extracted from below the feed plate.

[2] The method for manufacturing 1,3-butylene glycol according to [1], wherein the crude reaction liquid containing 1,3-butylene glycol is a crude reaction liquid obtained by hydrogen reduction of an acetaldol.

[3] The method for manufacturing 1,3-butylene glycol according to [1] or [2], further including an alkaline treatment step of treating a process stream containing 1,3-butylene glycol with a base.

[4] The method for manufacturing 1,3-butylene glycol according to any one of [1] to [3], further including a desalting step of removing a salt in a process stream containing 1,3-butylene glycol.

[5] The method for manufacturing 1,3-butylene glycol according to any one of [1] to [4], further including a dealcoholization step of removing a low boiling substance containing alcohols in a process stream containing 1,3-butylene glycol.

[6] The method for manufacturing 1,3-butylene glycol according to any one of [1] to [5], wherein the liquid feed into the dehydration column has an acetaldehyde content of 155 ppm or lower (or 140 ppm or lower, 100 ppm or lower, 90 ppm or lower, 80 ppm or lower, 70 ppm or lower, 60 ppm or lower, 50 ppm or lower, 40 ppm or lower, 30 ppm or lower, 20 ppm or lower, 10 ppm or lower, 5 ppm or lower, 3 ppm or lower, 2 ppm or lower, or 1 ppm or lower), and a crotonaldehyde content of 117 ppm or lower (or 100 ppm or lower, 90 ppm or lower, 80 ppm or lower, 70 ppm or lower, 60 ppm or lower, 50 ppm or lower, 40 ppm or lower, 30 ppm or lower, 20 ppm or lower, 10 ppm or lower, 5 ppm or lower, 3 ppm or lower, 2 ppm or lower, or 1 ppm or lower).

[7] The method for manufacturing 1,3-butylene glycol according to any one of [1] to [6], wherein the liquid feed into the dehydration column has a water content of 90 wt. % or lower (or 85 wt. % or lower, 80 wt. % or lower, 70 wt. % or lower, 60 wt. % or lower, 50 wt. % or lower, 40 wt. % or lower, 35 wt. % or lower, 30 wt. % or lower, or 25 wt. % or lower).

[8] The method for manufacturing 1,3-butylene glycol according to any one of [1] to [7], wherein the dehydration column has the number of theoretical plates from 1 to 100.

[9] The method for manufacturing 1,3-butylene glycol according to any one of [1] to [8], wherein the liquid feed into the product column has a 1,3-butylene glycol concentration of 90 GC area % or higher (or 92 GC area % or higher, 95 GC area % or higher, more preferably 97 GC area % or higher, 97.1 GC area % or higher, 97.2 GC area % or higher, 97.3 GC area % or higher, 97.4 GC area % or higher, 97.5 GC area % or higher, 97.6 GC area % or higher, 97.7 GC area % or higher, 97.8 GC area % or higher, 97.9 GC area % or higher, 98 GC area % or higher, 98.1 GC area % or higher, 98.2 GC area % or higher, 98.3 GC area % or higher, 98.4 GC area % or higher, 98.5 GC area % or higher, 98.6 GC area % or higher, 98.7 GC area % or higher, 98.8 GC area % or higher, 98.9 GC area % or higher, or 99 GC area % or higher), and has a water content of 3 wt. % or lower (or 2.8 wt. % or lower, 2.6 wt. % or lower, 2.4 wt. % or lower, 2.2 wt. % or lower, 2 wt. % or lower, 1.8 wt. % or lower, 1.6 wt. % or lower, 1.4 wt. % or lower, 1.2 wt. % or lower, 1.1 wt. % or lower, 1.0 wt. % or lower, 0.95 wt. % or lower, 0.9 wt. % or lower, 0.8 wt. % or lower, 0.7 wt. % or lower, 0.6 wt. % or lower, 0.5 wt. % or lower, 0.4 wt. % or lower, 0.3 wt. % or lower, 0.2 wt. % or lower, or 0.1 wt. % or lower).

[10] The method for manufacturing 1,3-butylene glycol according to any one of [1] to [9], wherein the liquid feed into the product column has a content of the low boiling point component other than water of 1.8 GC area % or lower (or 1.6 GC area % or lower, 1.4 GC area % or lower, 1.2 GC area % or lower, 1.1 GC area % or lower, 1 GC area % or lower, 0.9 GC area % or lower, 0.8 GC area % or lower, 0.7 GC area % or lower, 0.6 GC area % or lower, 0.5 GC area % or lower, 0.4 GC area % or lower, 0.3 GC area % or lower, 0.2 GC area % or lower, or 0.1 GC area % or lower).

[11] The method for manufacturing 1,3-butylene glycol according to any one of [1] to [10], wherein the liquid feed into the product column has the acetaldehyde content of 205 ppm or lower (or 200 ppm or lower, 150 ppm or lower, 120 ppm or lower, 100 ppm or lower, 90 ppm or lower, 80 ppm or lower, 70 ppm or lower, 60 ppm or lower, 50 ppm or lower, 40 ppm or lower, 30 ppm or lower, 20 ppm or lower, 10 ppm or lower, 5 ppm or lower, or lower than 2 ppm), and the crotonaldehyde content of 110 ppm or lower (or 100 ppm or lower, 80 ppm or lower, 70 ppm or lower, 60 ppm or lower, 50 ppm or lower, 40 ppm or lower, 30 ppm or lower, 20 ppm or lower, 10 ppm or lower, 5 ppm or lower, 3 ppm or lower, 2 ppm or lower, or lower than 1 ppm).

[12] The method for manufacturing 1,3-butylene glycol according to any one of [1] to [11], wherein the product column has a distillation rate of lower than 30 wt. %, (or 29 wt. % or lower, 28 wt. % or lower, 27 wt. % or lower, 26 wt. % or lower, 25 wt. % or lower, 24 wt. % or lower, 23 wt. % or lower, 22 wt. % or lower, 21 wt. % or lower, 20 wt. % or lower, 19 wt. % or lower, 18 wt. % or lower, 17 wt. % or lower, 16 wt. % or lower, 15 wt. % or lower, 12 wt. % or lower, 10 wt. % or lower, 8 wt. % or lower, 5 wt. % or lower, 3 wt. % or lower, 2 wt. % or lower, 1 wt. % or lower, 0.8 wt. % or lower, 0.6 wt. % or lower, or 0.4 wt. % or lower).

[13] The method for manufacturing 1,3-butylene glycol according to any one of [1] to [12], wherein the product columns has the number of theoretical plates from 1 to 100.

[14] The method for manufacturing 1,3-butylene glycol according to any one of [1] to [13], wherein at least a portion of a distillate from the product column is recycled to a step prior to the product distillation step, namely the dehydration step, a dealcoholization step, a low boiling substance removal step, or another step prior to these steps.

[15] The method for manufacturing 1,3-butylene glycol according to [14], wherein the crude reaction liquid containing 1,3-butylene glycol is a crude reaction liquid obtained by hydrogen reduction of an acetaldol, and at least a portion of the distillate from the product column is recycled to the hydrogen reduction of an acetaldol or a step upstream of the hydrogen reduction.

[16] The method for manufacturing 1,3-butylene glycol according to [14] or [15], wherein an amount of the distillate from the product column being recycled to a step prior to the product distillation is lower than 30 wt. % with respect to a charged amount into the product column within a range not higher than a distilled amount in the product column.

[17] A 1,3-butylene glycol product, having an initial boiling point of higher than 203° C. (or 204° C. or higher, 205° C. or higher, 206° C. or higher, 207° C. or higher, or 208° C. or higher) and a potassium permanganate test value of 30 minutes or longer (or longer than 30 minutes, 32 minutes or longer, 35 minutes or longer, 40 minutes or longer, 50 minutes or longer, or 60 minutes or longer).

[18] The 1,3-butylene glycol product according to [17], having, according to a gas chromatographic analysis performed under conditions set forth below:
  an area ratio of a 1,3-butylene glycol peak of higher than 98.7% (or 98.8% or higher, 98.9% or higher, 99% or higher, 99.1% or higher, 99.2% or higher, 99.3% or higher, 99.4% or higher, 99.5% or higher, 99.6% or higher, 99.7% or higher, or 99.8% or higher), and
  a total area ratio of peaks having shorter retention times than the 1,3-butylene glycol peak of lower than 0.3% (or 0.28% or lower, 0.25% or lower, 0.23% or lower, 0.2% or lower, 0.17% or lower, 0.15% or lower, 0.12% or lower, 0.1% or lower, 0.07% or lower, 0.04% or lower, 0.03% or lower, 0.02% or lower, 0.01% or lower, 0.007% or lower, 0.005% or lower, or 0.002% or lower), and
  having: a water content of lower than 0.4 wt. % (or 0.3 wt. % or lower, 0.2 wt. % or lower, 0.1 wt. % or lower, 0.07 wt. % or lower, 0.05 wt. % or lower, 0.03 wt. % or lower, 0.02 wt. % or lower, 0.01 wt. % or lower, or 0.005 wt. % or lower);
  an acetaldehyde content of lower than 2 ppm (or 1.8 ppm or lower, 1.7 ppm or lower, 1.5 ppm or lower, 1.4 ppm or lower, 1.3 ppm or lower, 1.2 ppm or lower, 1.0 ppm or lower, 1.1 ppm or lower, 0.9 ppm or lower, 0.8 ppm or lower, 0.7 ppm or lower, 0.6 ppm or lower, 0.5 ppm or lower, 0.3 ppm or lower, or 0.2 ppm or lower); and
  a crotonaldehyde content of lower than 1.2 ppm (or 1.0 ppm or lower, 0.9 ppm or lower, 0.8 ppm or lower, 0.7 ppm or lower, 0.6 ppm or lower, 0.5 ppm or lower, 0.4 ppm or lower, 0.3 ppm or lower, 0.2 ppm or lower, or 0.1 ppm or lower),
  wherein the conditions for the gas chromatographic analysis are as follows:
  Analytical Column: a column with dimethylpolysiloxane as a stationary phase, having a length of 30 m, an inner diameter of 0.25 mm, and a film thickness of 1.0 μm
  Heating Conditions: heating from 80° C. to 120° C. at 5° C./min, then heating again to 160° C. at 2° C./min and maintaining for 2 minutes, and further heating to 230° C. at 10° C./min and maintaining at 230° C. for 18 minutes Sample Introduction Temperature: 250° C.
  Carrier Gas: helium
  Column Gas Flow Rate: 1 mL/min
  Detector and Detection Temperature: a flame ionization detector (FID), 280° C.

[19] A moisturizer containing the 1,3-butylene glycol product described in [17] or [18].

[20] The moisturizer according to [19], wherein a content of the 1,3-butylene glycol product described in [17] or [18] is 10 wt. % or higher (or 30 wt. % or higher, 50 wt. % or higher, 80 wt. % or higher, or 90 wt. % or higher).

[21] A cosmetic product containing the moisturizer described in [19] or [20]. [22] The cosmetic product according to [21], wherein a content of the 1,3-butylene glycol product described in [17] or [18] is from 0.01 to 40 wt. % (or from 0.1 to 30 wt. %, from 0.2 to 20 wt. %, from 0.5 to 15 wt. %, or from 1 to 10 wt. %).

[23] The cosmetic product according to [21] or [22], which is a skin cosmetic product, a hair cosmetic product, a sunscreen cosmetic product, or a make-up cosmetic product.

INDUSTRIAL APPLICABILITY

According to the manufacturing method of the present disclosure, it is possible to industrially efficiently manufacture high-purity 1,3-butylene glycol having a high potassium permanganate test value, a very low content of low boiling point components, and a high initial boiling point. Also, the 1,3-butylene glycol product of the present disclosure has a high potassium permanganate test value, a very low content of the low boiling point component, a high initial boiling point, and high purity, and thus is suitably used as a moisturizer and in an application as a raw material for cosmetics. Further, the moisturizer and cosmetic product of the present disclosure are excellent in moisturizing performance and have an extremely low content of reducing materials and low boiling point components, and thus can maintain high quality for a long period of time.

REFERENCE SIGNS LIST

A: Dehydration column
B: Desalting column
C: Distillation column for removing a high boiling point substance (high boiling substance removal column)
D: Alkaline reactor
E: Dealkalization column
F: Product distillation column (product column)
A-1, B-1, C-1, E-1, F-1: Condenser
A-2, C-2, F-2: Reboiler
X-1: Crude 1,3-butylene glycol
X-2: Water (discharged water)
X-3: A salt, a high boiling point substance, and a portion of 1,3-butylene glycol
X-4: A high boiling point substance and a portion of 1,3-butylene glycol
X-5: Sodium hydroxide, a high boiling point substance, and a portion of 1,3-butylene glycol
X-6: A low boiling point substance and a portion of 1,3-butylene glycol
Y: 1,3-butylene glycol product

The invention claimed is:

1. A method for manufacturing 1,3-butylene glycol, which is a method for obtaining purified 1,3-butylene glycol from a crude reaction liquid containing 1,3-butylene glycol, the method comprising:
  a dehydration step of removing water by distillation; a high boiling substance removal step of removing a high boiling point component by distillation; and a product distillation step of obtaining purified 1,3-butylene glycol,
  wherein in the dehydration step, a dehydration column is used in which a liquid feed containing 1,3-butylene glycol and water with an acetaldehyde content of 1000 ppm or lower and a crotonaldehyde content of 400 ppm or lower is distilled under a condition where a reflux ratio is greater than 0.3 and not greater than 100, and a liquid concentrated with a low boiling point component containing water is distilled off from above a feed plate, and
  in the product distillation step, a product column is used in which a 1,3-butylene glycol liquid feed with an acetaldehyde content of 500 ppm or lower and a crotonaldehyde content of 200 ppm or lower is distilled under a condition of a reflux ratio of higher than 0.1, a liquid concentrated with a low boiling point component is distilled off from above a feed plate, and 1,3-butylene glycol is extracted from below the feed plate.

2. The method for manufacturing 1,3-butylene glycol according to claim 1, wherein the crude reaction liquid containing 1,3-butylene glycol is a crude reaction liquid obtained by hydrogen reduction of an acetaldol.

3. The method for manufacturing 1,3-butylene glycol according to claim 1, further comprising an alkaline treatment step of treating a process stream containing 1,3-butylene glycol with a base.

4. The method for manufacturing 1,3-butylene glycol according to claim 1, further comprising a desalting step of removing a salt in a process stream containing 1,3-butylene glycol.

5. The method for manufacturing 1,3-butylene glycol according to claim 1, further comprising a dealcoholization step of removing a low boiling substance containing alcohols in a process stream containing 1,3-butylene glycol.

6. The method for manufacturing 1,3-butylene glycol according to claim 1, wherein the liquid feed into the dehydration column has the acetaldehyde content of 155 ppm or lower and the crotonaldehyde content of 117 ppm or lower.

7. The method for manufacturing 1,3-butylene glycol according to claim 1, wherein the liquid feed into the dehydration column has a water content of 90 wt. % or lower.

8. The method for manufacturing 1,3-butylene glycol according to claim 1, wherein the dehydration column has the number of theoretical plates of from 1 to 100.

9. The method for manufacturing 1,3-butylene glycol according to claim 1, wherein the liquid feed into the product column has a 1,3-butylene glycol concentration of 90 GC area % or higher and a water content of 3 wt. % or lower.

10. The method for manufacturing 1,3-butylene glycol according to claim 1, wherein the liquid feed into the product column has a content of the low boiling point component other than water of 1.8 GC area % or lower.

11. The method for manufacturing 1,3-butylene glycol according to claim 1, wherein the liquid feed into the product column has the acetaldehyde content of 205 ppm or lower and the crotonaldehyde content of 110 ppm or lower.

12. The method for manufacturing 1,3-butylene glycol according to claim 1, wherein the product column has a distillation rate of lower than 30 wt. %.

13. The method for manufacturing 1,3-butylene glycol according to claim 1, wherein the product column has the number of theoretical plates of from 1 to 100.

14. The method for manufacturing 1,3-butylene glycol according to claim 1, wherein at least a portion of a distillate from the product column is recycled to a step prior to the product distillation step, namely the dehydration step, a dealcoholization step, a low boiling point substance removal step, or another step prior to these steps.

15. The method for manufacturing 1,3-butylene glycol according to claim 14, wherein the crude reaction liquid containing 1,3-butylene glycol is a crude reaction liquid obtained by hydrogen reduction of an acetaldol, and at least a portion of the distillate from the product column is recycled to the hydrogen reduction of an acetaldol or a step upstream of the hydrogen reduction.

16. The method for manufacturing 1,3-butylene glycol according to claim 14, wherein an amount of the distillate from the product column being recycled to a step prior to the product distillation is lower than 30 wt. % with respect to a charged amount into the product column within a range not higher than a distilled amount in the product column.

17. The method for manufacturing 1,3-butylene glycol according to claim 1, wherein the 1,3-butylene glycol product, has an initial boiling point of higher than 203° C. and a potassium permanganate test value of 30 minutes or longer.

18. The method for manufacturing 1,3-butylene glycol according to claim 1, wherein the 1,3-butylene glycol product has, according to a gas chromatographic analysis performed under conditions set forth below:

an area ratio of a 1,3-butylene glycol peak of higher than 98.7%;

a total area ratio of peaks having shorter retention times than the 1,3-butylene glycol peak of lower than 0.3%; and having: a water content of lower than 0.4 wt. %;

an acetaldehyde content of lower than 2 ppm; and a crotonaldehyde content of lower than 1.2 ppm, wherein the conditions for the gas chromatographic analysis are as follows:

Analytical Column: a column with dimethylpolysiloxane as a stationary phase, having a length of 30 m, an inner diameter of 0.25 mm, and a film thickness of 1.0 μm Heating Conditions: heating from 80° C. to 120° C. at 5° C./min, then heating again to 160° C. at 2° C./min and maintaining for 2 minutes, and further heating to 230° C. at 10° C./min and maintaining at 230° C. for 18 minutes Sample Introduction Temperature: 250° C.

Carrier Gas: helium

Column Gas Flow Rate: 1 mL/min

Detector and Detection Temperature: a flame ionization detector (FID), 280° C.

19. The method for manufacturing 1,3-butylene glycol according to claim 1, wherein the 1,3-butylene glycol product is to be contained in a moisturizer.

20. The method for manufacturing 1,3-butylene glycol according to claim 1, wherein the 1,3-butylene glycol product is to be contained in a cosmetic product.

* * * * *